(12) United States Patent
Yajima et al.

(10) Patent No.: US 7,061,465 B2
(45) Date of Patent: Jun. 13, 2006

(54) LIQUID CRYSTAL DISPLAY

(75) Inventors: Toshihiro Yajima, Mobara (JP); Seiichi Nishiyama, Mobara (JP); Shigetake Takaku, Mobara (JP); Shoichi Noguchi, Shirako (JP); Yoshiharu Takeda, Mobara (JP)

(73) Assignees: Hitachi, Ltd., Tokyo (JP); Hitachi Electronics Devices Co., Ltd., Mobara (JP)

( * ) Notice: Subject to any disclaimer, the term of this patent is extended or adjusted under 35 U.S.C. 154(b) by 559 days.

(21) Appl. No.: 09/942,618

(22) Filed: Aug. 31, 2001

(65) Prior Publication Data

US 2002/0041268 A1    Apr. 11, 2002

(30) Foreign Application Priority Data

Sep. 4, 2000    (JP)    ............................. 2000-266619

(51) Int. Cl.
*G06G 3/36* (2006.01)

(52) U.S. Cl. ..................................... 345/102

(58) Field of Classification Search ............ 345/87–93, 345/102; 362/19–31, 84; 315/105–107, 315/151–158
See application file for complete search history.

(56) References Cited

U.S. PATENT DOCUMENTS

| | | | | |
|---|---|---|---|---|
| 5,907,222 A * | 5/1999 | Lengyel et al. | ............. | 315/158 |
| 6,088,543 A * | 7/2000 | Kaji et al. | .................. | 396/176 |
| 6,210,012 B1 * | 4/2001 | Broer | .......................... | 362/84 |
| 6,286,971 B1 * | 9/2001 | Hori | ........................... | 362/31 |
| 6,331,064 B1 | 12/2001 | Nishiyama et al. | ......... | 362/260 |
| 2002/0021564 A1 | 2/2002 | Cho et al. | | |
| 2004/0232853 A1 * | 11/2004 | Hur et al. | .................. | 315/291 |

* cited by examiner

*Primary Examiner*—Vijay Shankar
(74) *Attorney, Agent, or Firm*—Antonelli, Terry, Stout and Kraus, LLP.

(57) ABSTRACT

There is provided a liquid crystal display device having a longer useful life and in which its so-called picture frame area can be narrowed. The liquid crystal display device includes a liquid crystal display panel having a display part in its central portion and a backlight disposed on a back side of the liquid crystal display panel. The backlight includes a discharge tube having electrodes at least at its opposite ends, and the electrodes are disposed at the exterior of the discharge tube. The opposite end portions of the discharge tube where the respective electrodes are disposed are positioned to be superposed on the periphery of the liquid crystal display panel and are bent with an angle with respect to the central axis of the discharge tube.

4 Claims, 27 Drawing Sheets

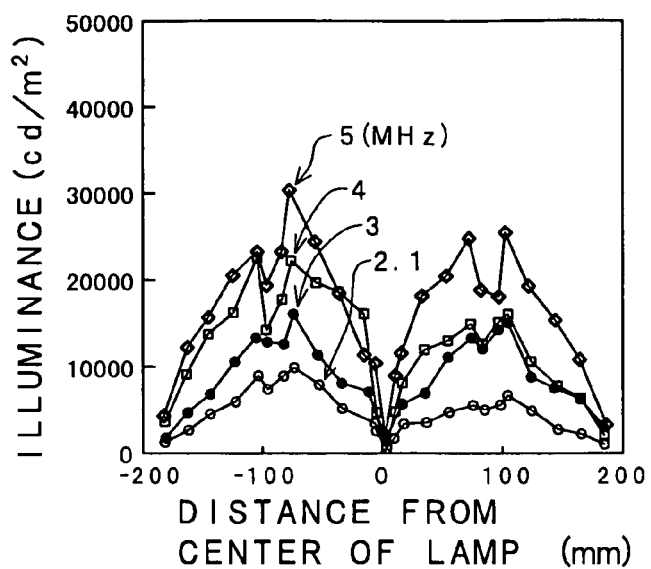
FIG. 7A  800 (Vp-p)
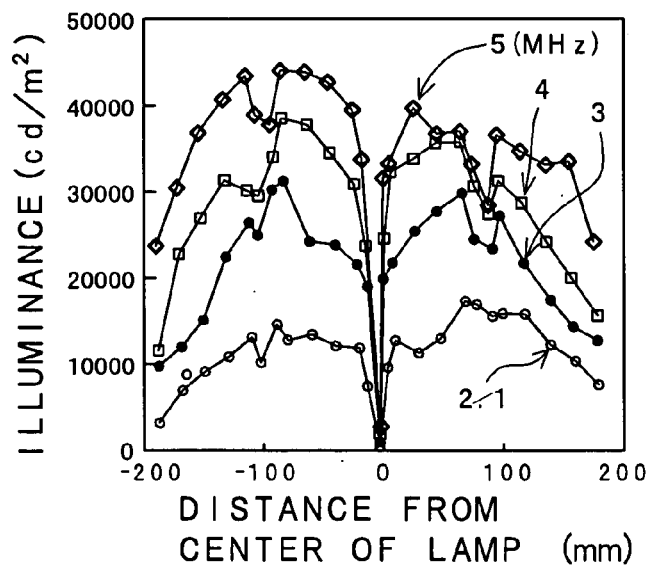
FIG. 7B  900 (Vp-p)
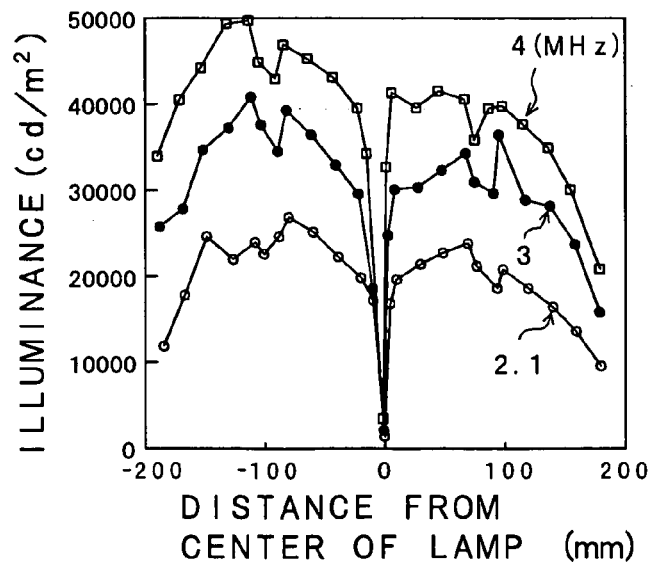
FIG. 7C  1000 (Vp-p)

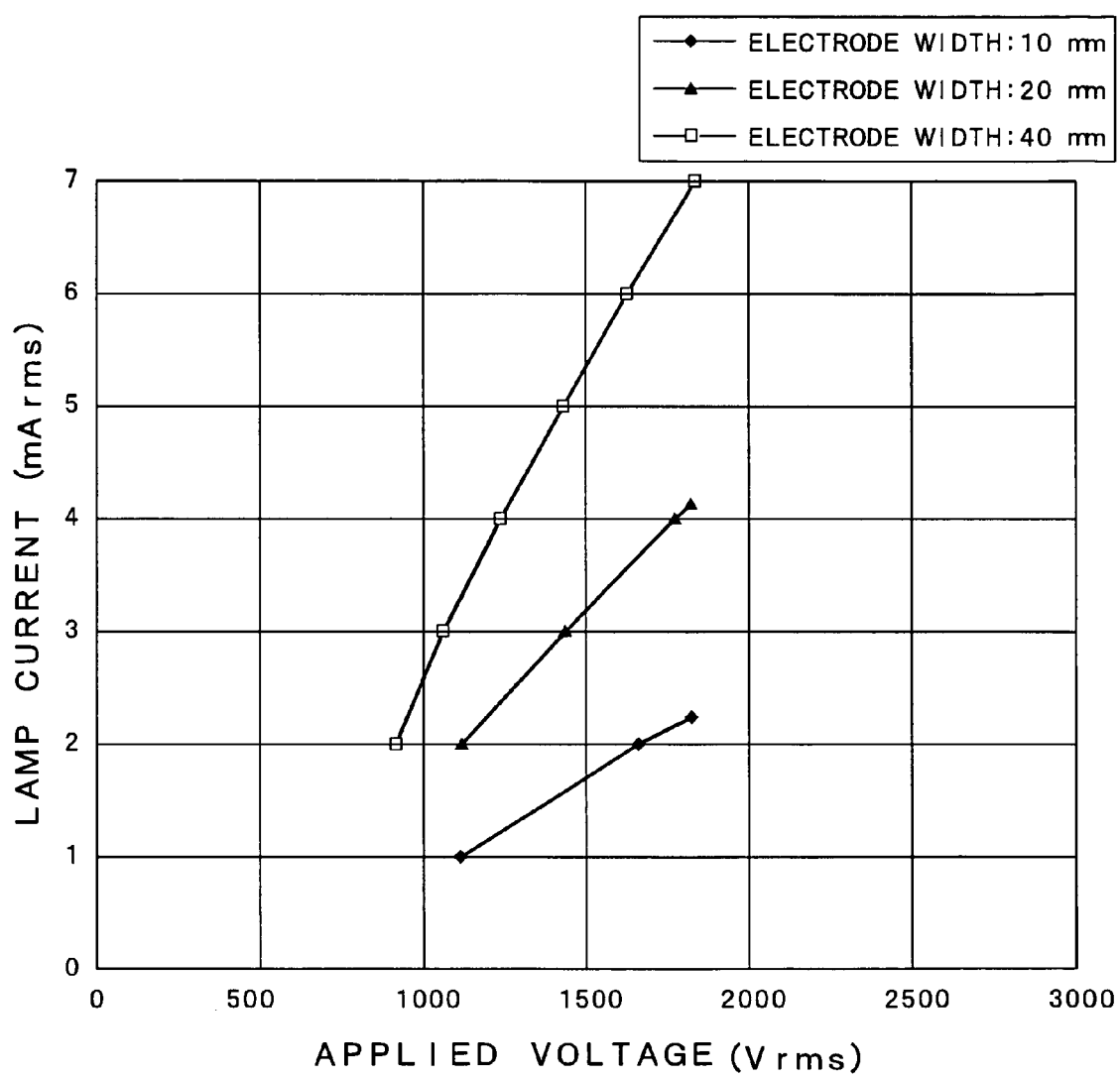

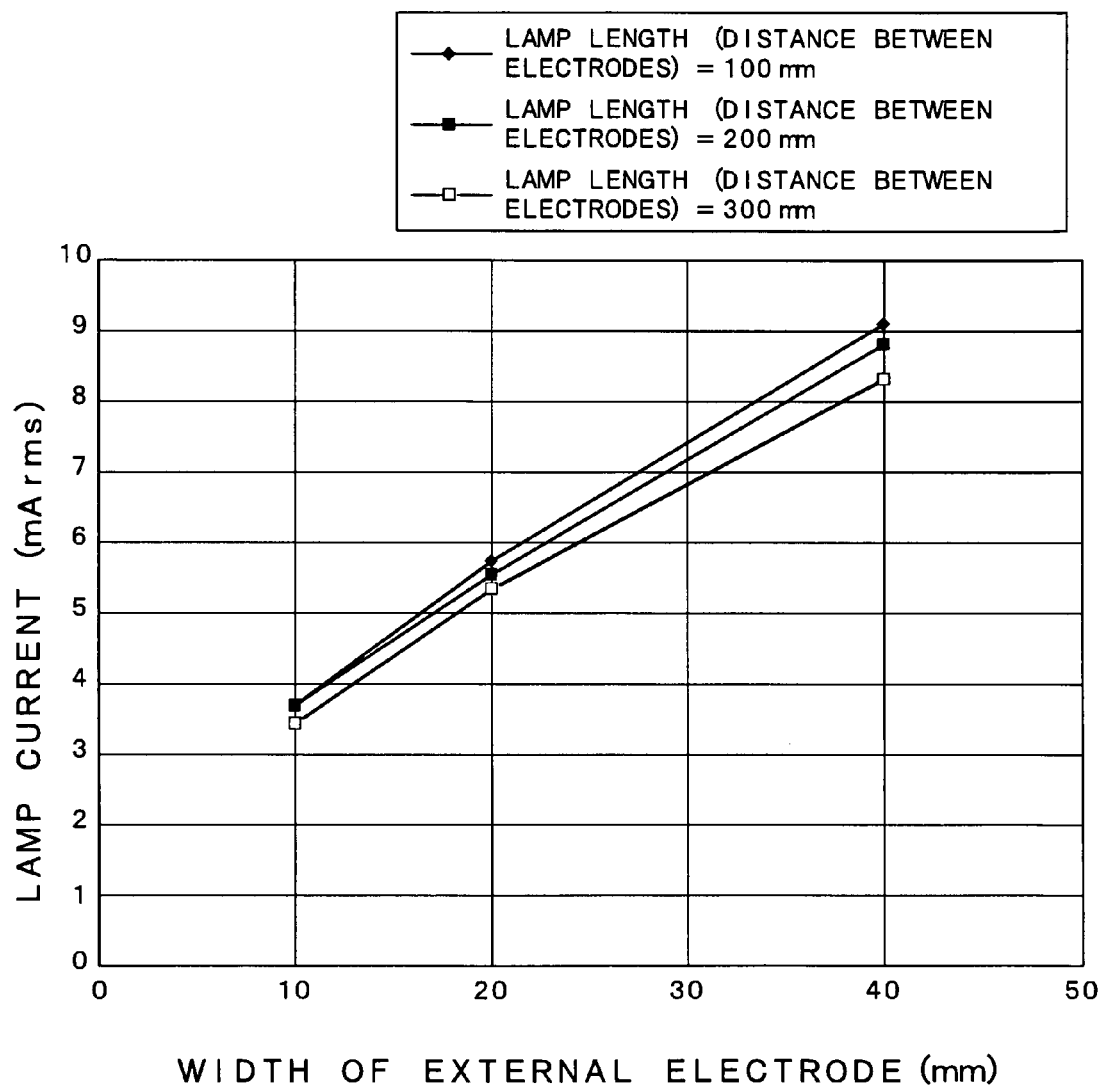

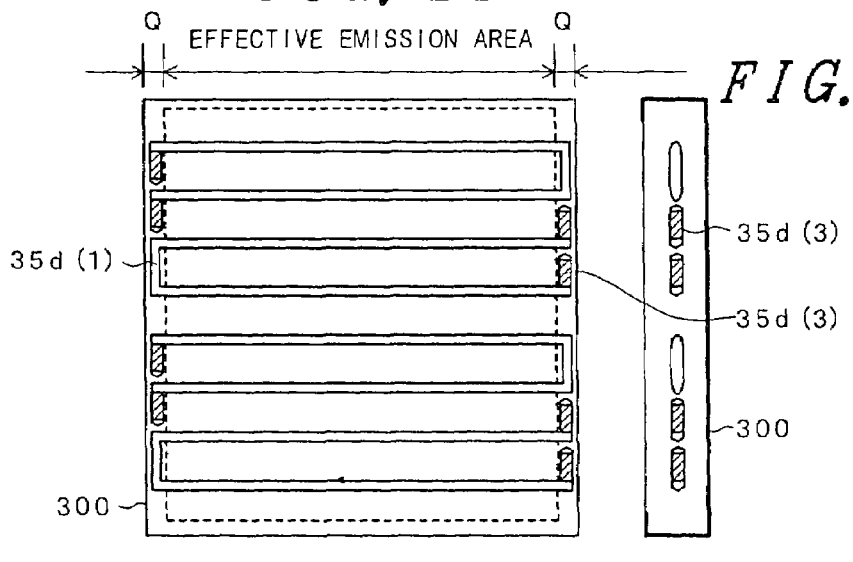
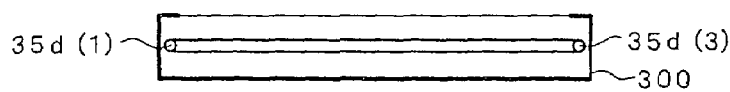
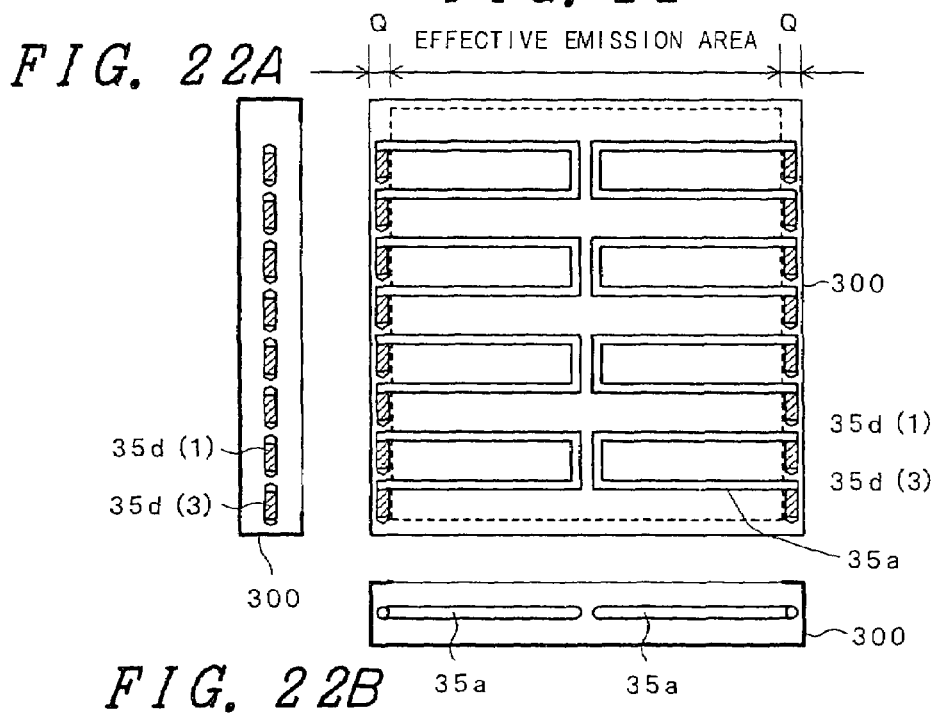

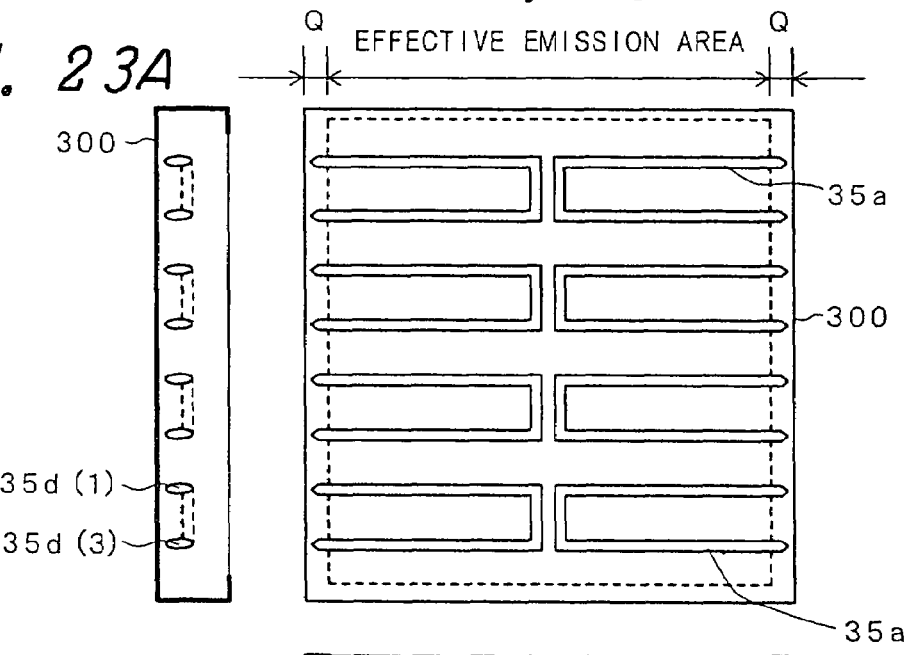
FIG. 23
FIG. 23A
FIG. 23B
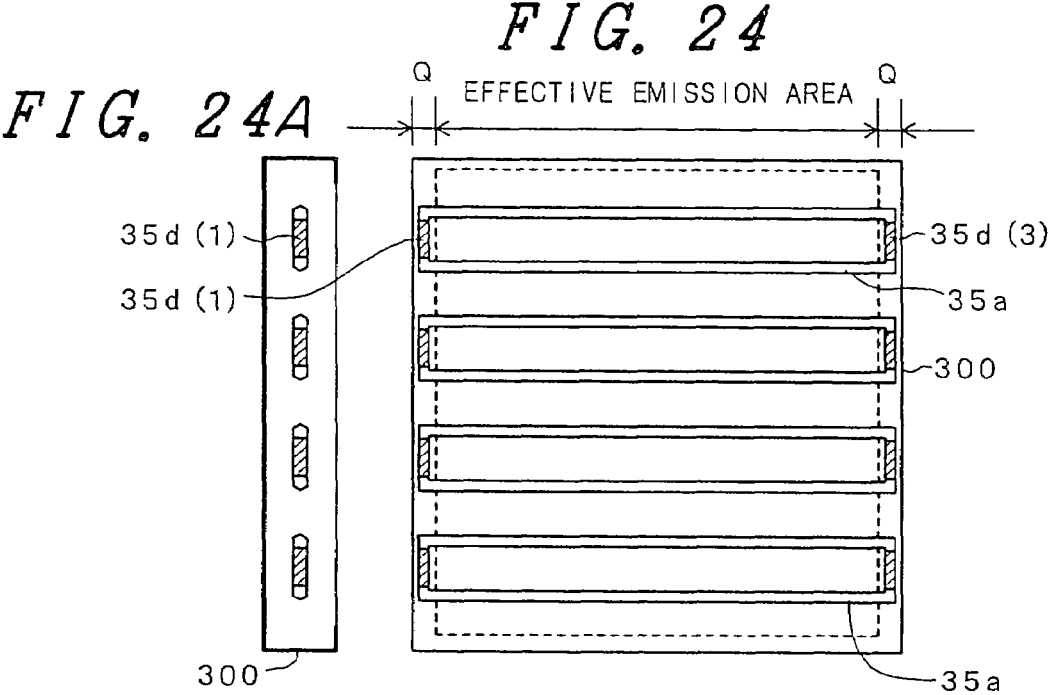
FIG. 24
FIG. 24A
FIG. 24B

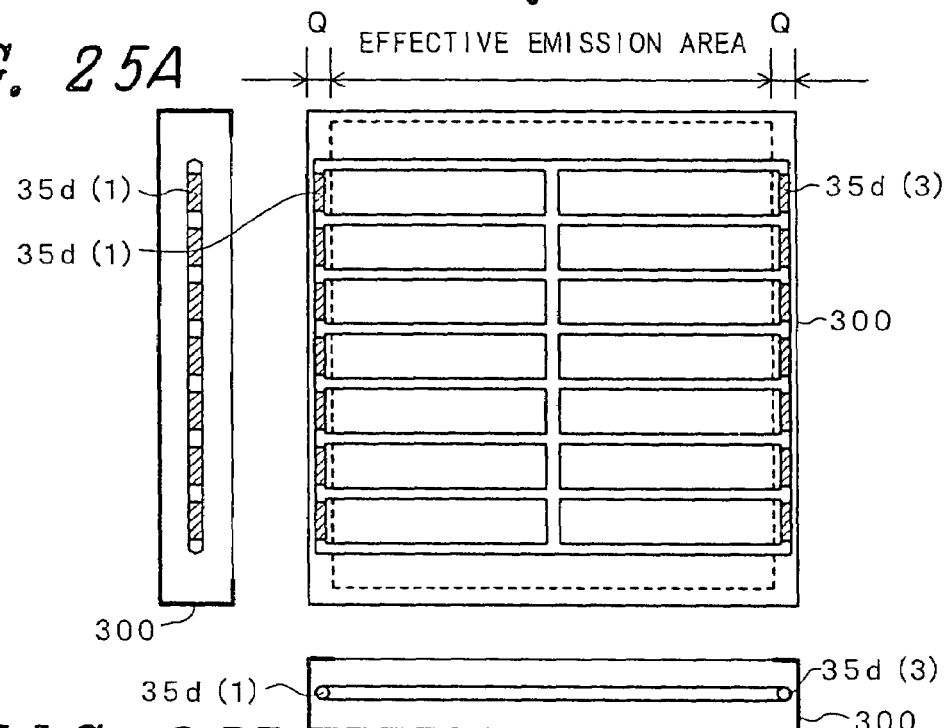
FIG. 25
FIG. 25A
FIG. 25B
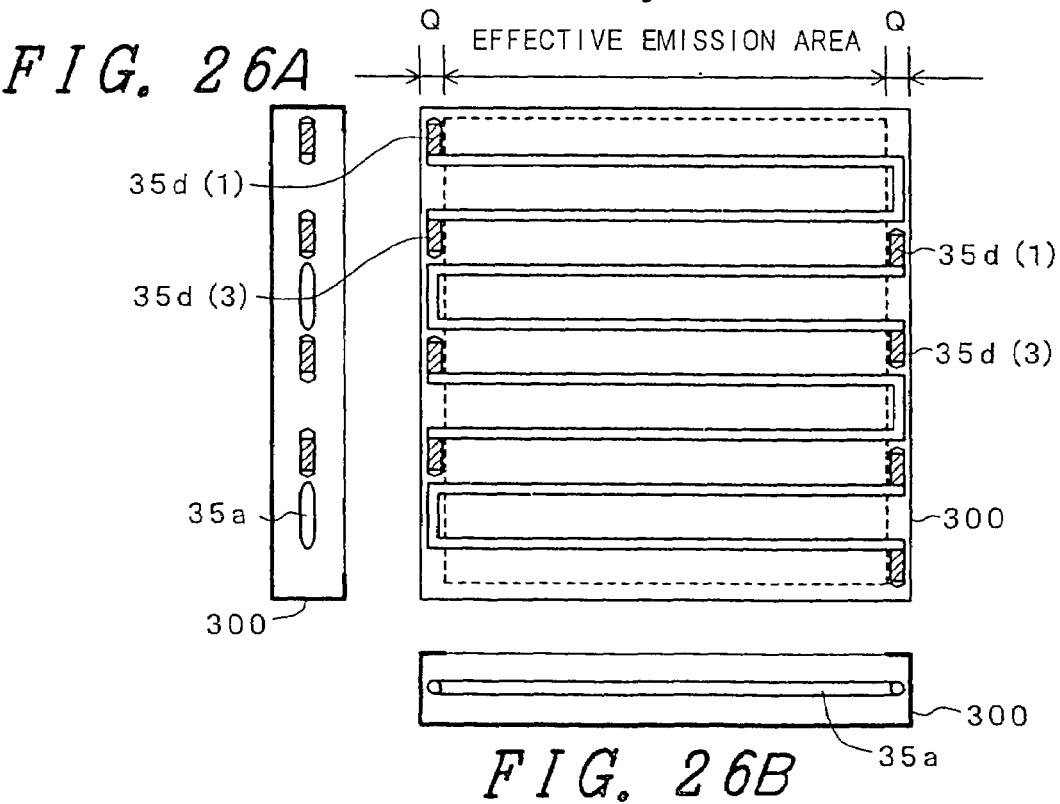
FIG. 26
FIG. 26A
FIG. 26B

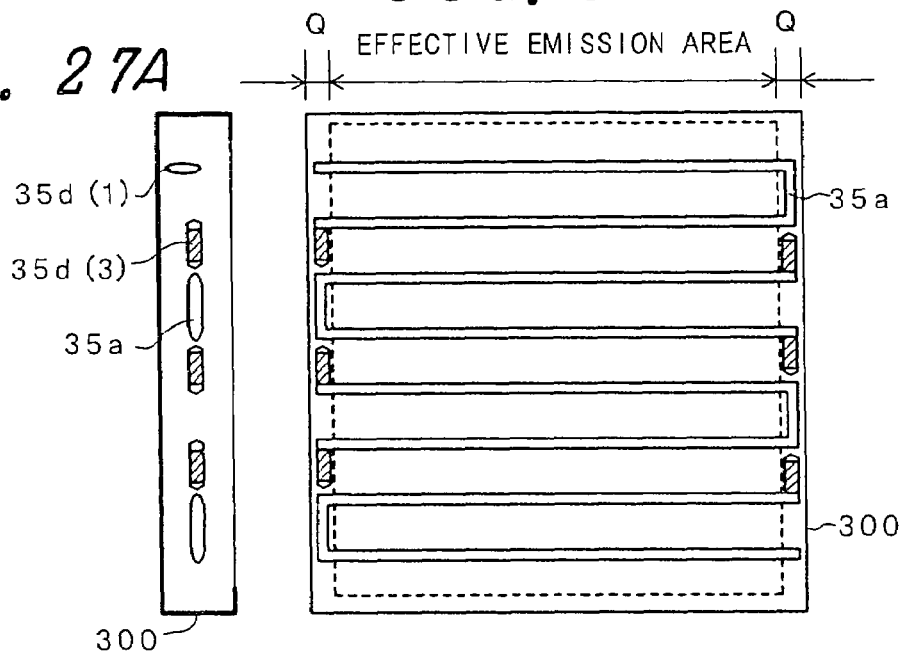
FIG. 27
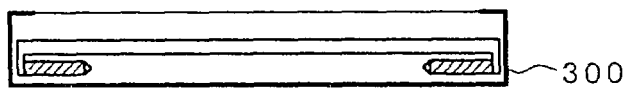
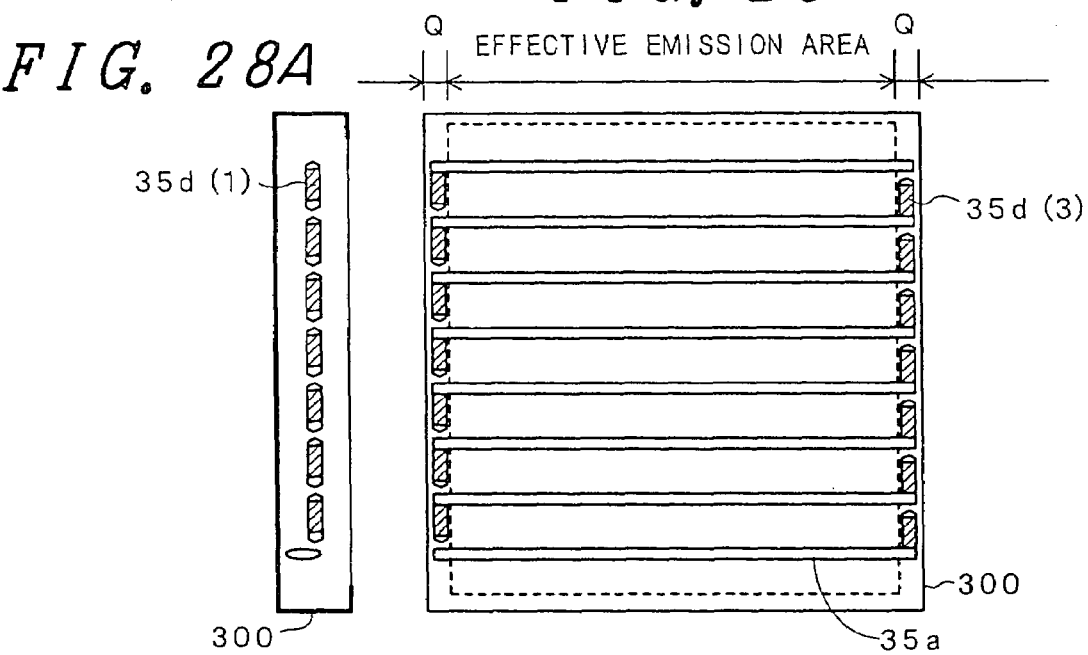
FIG. 28
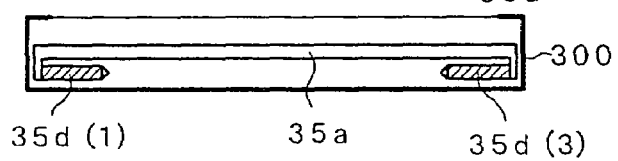

FIG. 29
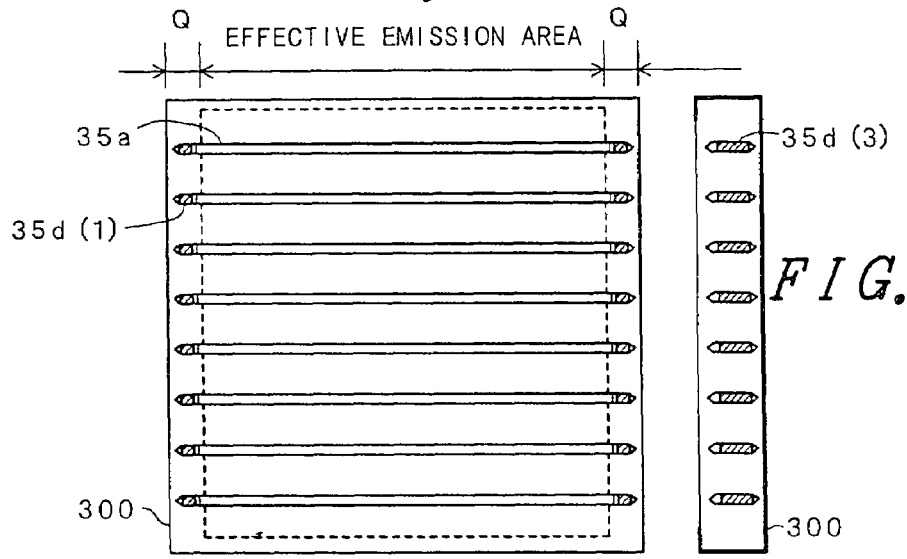
FIG. 29A
FIG. 29B
FIG. 30
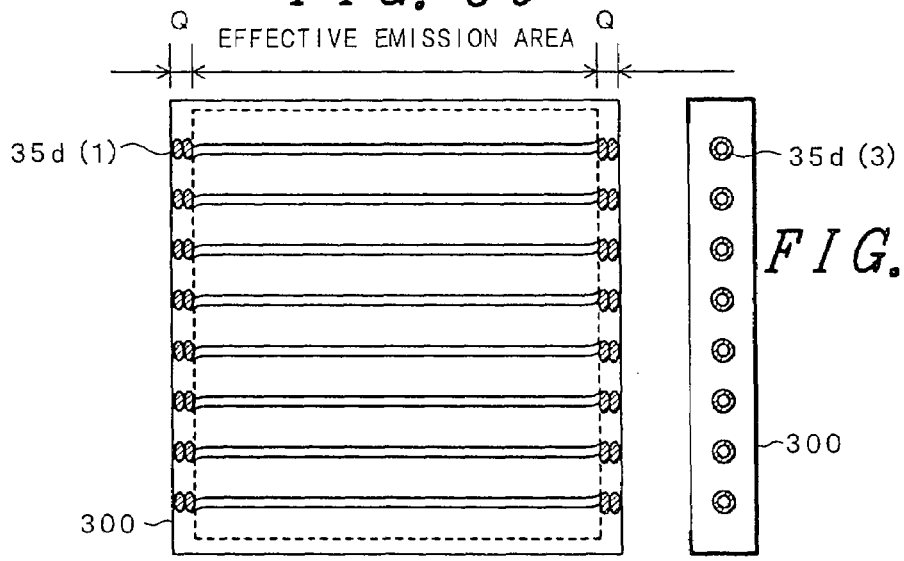
FIG. 30A
FIG. 30B

FIG. 32
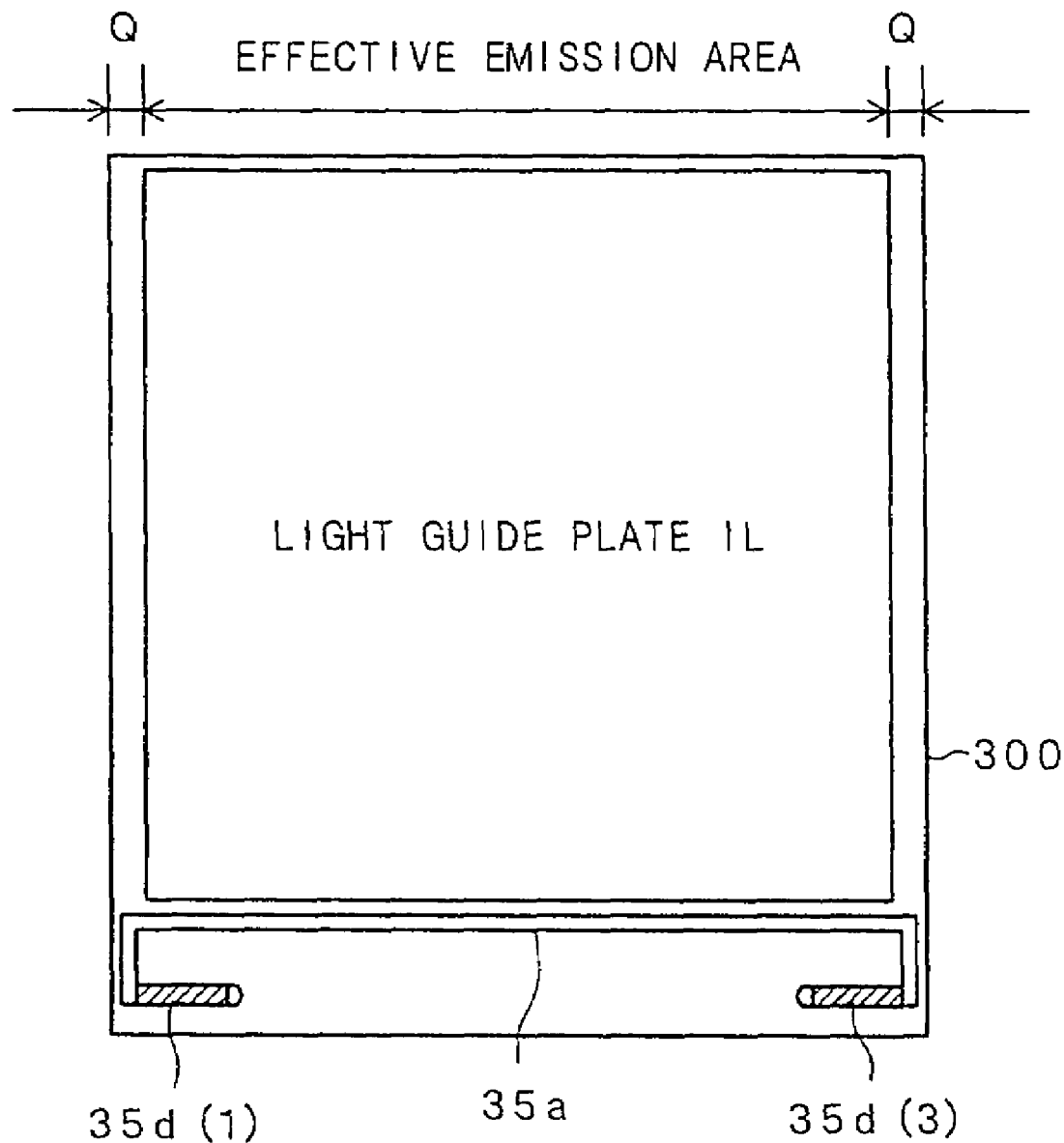
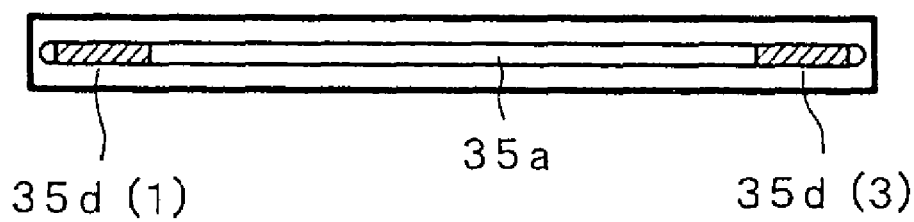
FIG. 32A

FIG. 35
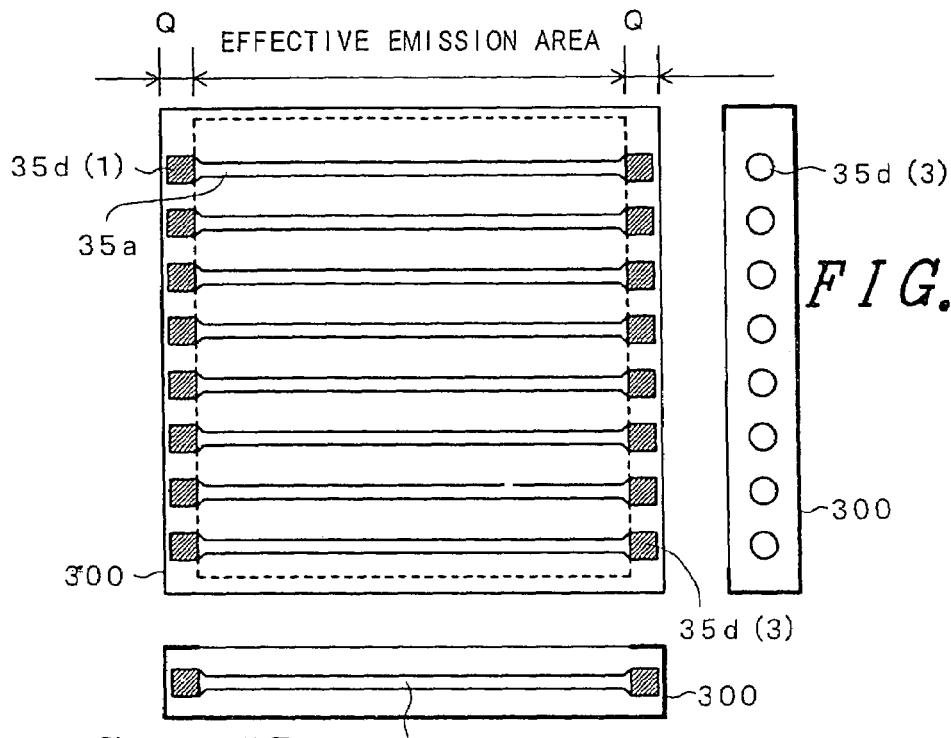
FIG. 35A
FIG. 35B
FIG. 36
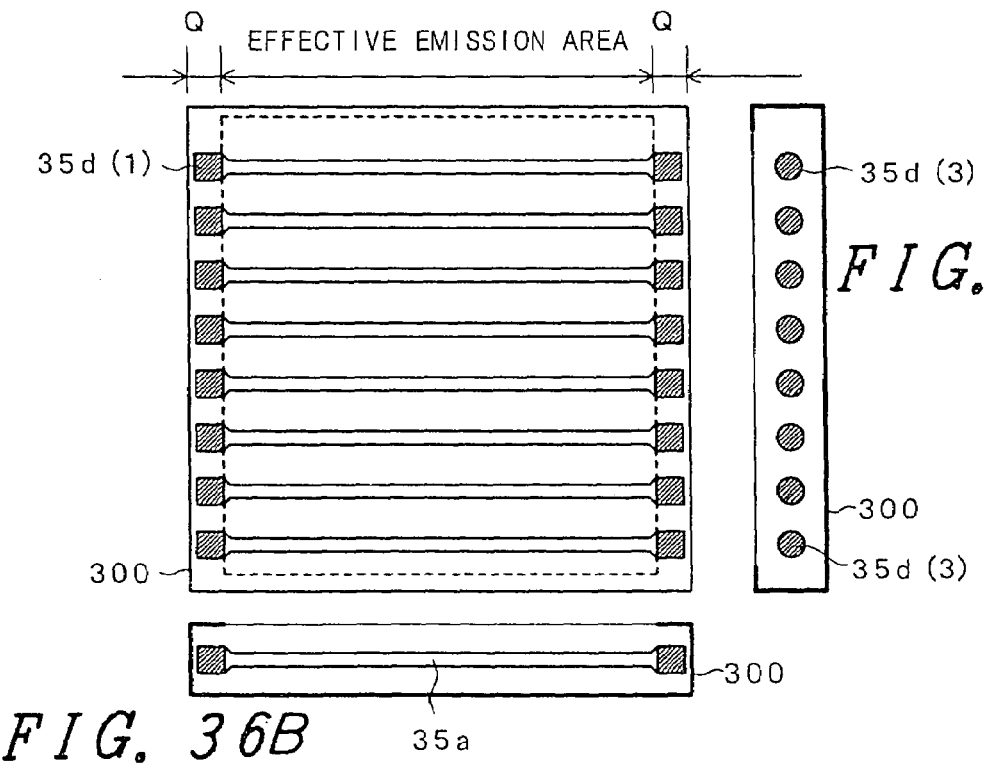
FIG. 36A
FIG. 36B

FIG. 39
35d (1)   35a   35d (3)
A
FIG. 39A
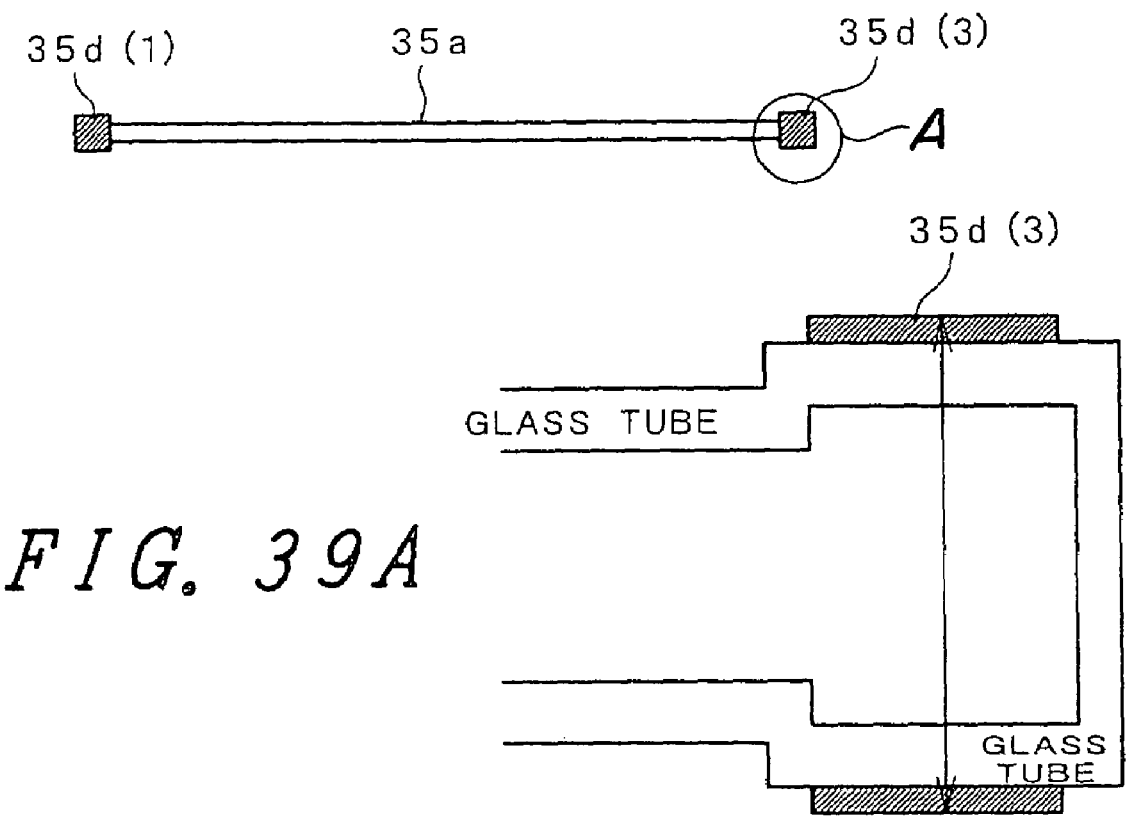
FIG. 39B
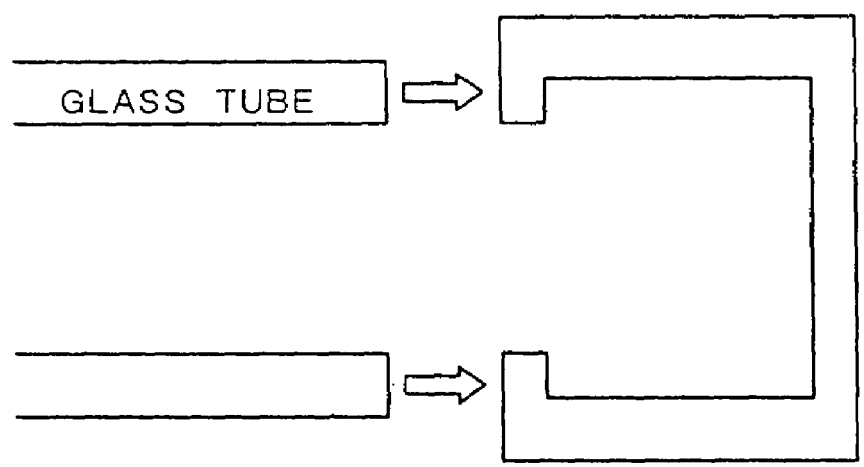

FIG. 40
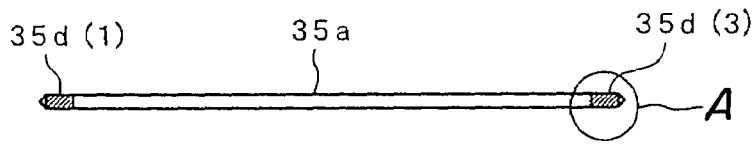
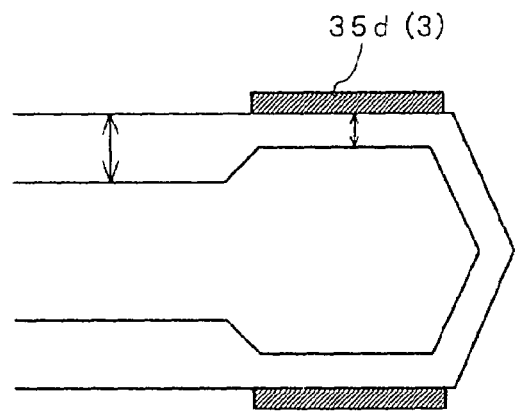
FIG. 40A
FIG. 41
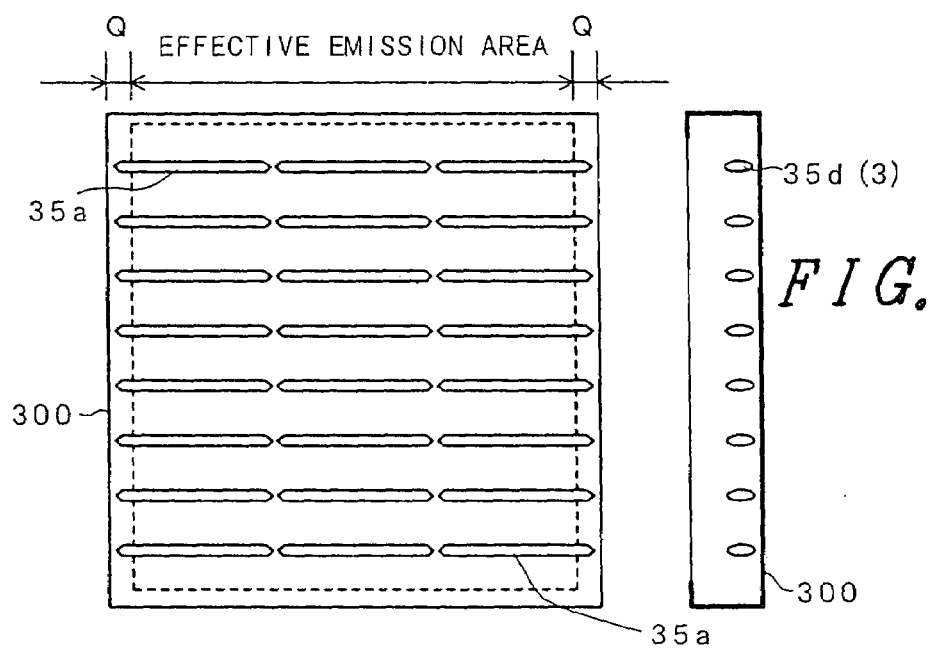
FIG. 41A
FIG. 41B

LIQUID CRYSTAL DISPLAY

BACKGROUND OF THE INVENTION

The present invention relates to a liquid crystal display device; and, more particularly, the invention relates to a liquid crystal display device including a liquid crystal display panel and a back light disposed on the back side of the liquid crystal display panel.

A liquid crystal display device typically includes a panel made of transparent substrates disposed so as to be opposed to each other with a liquid crystal material interposed therebetween, and multiple pixels are formed in the area of the liquid crystal material. In this case, each of the pixels only has the function of controlling the amount of light being transmitted through the liquid crystal material, and does not itself emit light. For this reason, ordinarily, a backlight is disposed on the back side of the liquid crystal display panel.

This backlight is provided with not only a light source, but also a diffusing sheet and a reflector in order to cause the irradiation of light onto the liquid crystal display panel to be uniform. The light source uses a cold-cathode fluorescent tube (CFL) having a length approximately equal to the length of one side of the liquid crystal display panel, and is made to function as an illuminant by a voltage being applied to each of the electrodes formed to project from the opposite ends of the tube. However, in the liquid crystal display device having such a construction, the life of the light source is not sufficient, and it is no exaggeration to say that the life of the liquid crystal display device is determined by the life of the light source.

Specifically, during the lighting of the cold-cathode fluorescent tube, an electrode substance inside the tube is sputtered, and the electrode substance sticks to the tube wall. This electrode substance can be recognized as a black substance from the outside of the tube. The electrode substance which is stuck to the tube wall is alloyed (forms an amalgam) with mercury in the tube, and the consumption of mercury leads to the end of the life of the cold-cathode fluorescent tube.

SUMMARY OF THE INVENTION

The invention has been made in view of the above-described problems, and an object of the invention is to provide a liquid crystal display device having a longer useful life.

Another object of the invention is to provide a liquid crystal display device in which it is possible to narrow an area called a picture frame (the area between the outline of the outer frame of the liquid crystal display device and the outline of its display part).

Representative aspects of the invention disclosed herein will be described below in brief.

A liquid crystal display device according to the invention includes, for example, a liquid crystal display panel having a display part in its central portion, inside of its periphery, and a backlight disposed on a back side of the liquid crystal display panel. The backlight includes a discharge tube having electrodes at least at its opposite ends, and the electrodes are disposed at the exterior of the discharge tube. The opposite end portions of the discharge tube where the respective electrodes are disposed are positioned to be superposed on the periphery of the liquid crystal display panel, and are bent at an angle with respect to the central axis of the discharge tube.

In the liquid crystal display device constructed in this manner, the electrodes of the discharge tube which serves as a light source are disposed at the exterior of the discharge tube; that is to say, the electrodes are not formed inside the discharge tube. Accordingly, mercury in the discharge tube is not consumed by these electrodes, whereby it is possible to provide a light source having an increased useful life.

The opposite end portions of the discharge tube where the respective electrodes are disposed are positioned to be superposed on an area other than the display part of the liquid crystal display panel and are bent at an angle with respect to the central axis of the discharge tube. Accordingly, it is possible to narrow the peripheral area, which is referred to as a picture frame.

In the case of a construction in which the electrodes of the discharge tube are disposed at the exterior thereof, it has been confirmed that the discharge effect of the discharge tube can be enhanced by increasing the width of each of the electrodes along the axial direction of the discharge tube. Accordingly, in a case where the portions of the electrodes are positioned to be superposed on an area other than the display part of the liquid crystal display panel without being bent, the width occupied by the area which makes up the picture frame becomes large. However, this disadvantage can be solved by adopting the above-described construction.

On the other hand, in a case where it is not necessary to narrow the width of the area of the picture frame, by bending the opposite end portions of the discharge tube where the respective electrodes are disposed, it is possible to increase the lengths of the opposite end portions, and hence it is possible to increase the width of each of the electrodes. Accordingly, it is possible to enhance the discharge effect of the discharge tube.

BRIEF DESCRIPTION OF THE DRAWINGS

The invention will become more readily appreciated and understood from the following detailed description of preferred embodiments of the invention when taken in conjunction with the accompanying drawings, in which:

FIGS. 7A to 7C are graphs showing the illuninance distribution of the light source of the liquid crystal display device according to the invention;

FIG. 12 is a plan view and FIGS. 12(a) to 12(d) are respective side views showing the construction of an assembly of the liquid crystal display device according to the invention;

FIG. 17 is a graph showing the advantage obtained by increasing the lengths of the electrodes of the discharge tube;

FIG. 18 is a graph showing the advantage obtained by increasing the lengths of the electrodes of the discharge tube;

FIG. 20 is a plan view and FIGS. 20A and 20B are side views showing another embodiment of the backlight unit of the liquid crystal display device according to the invention;

FIG. 21 is a plan view and FIGS. 21A and 21B are side views showing another embodiment of the backlight unit of the liquid crystal display device according to the invention;

FIG. 22 is a plan view and FIGS. 22A and 22B are side views showing another embodiment of the backlight unit of the liquid crystal display device according to the invention;

FIG. 23 is a plan view and FIGS. 23A and 23B are side views showing another embodiment of the backlight unit of the liquid crystal display device according to the invention;

FIG. 24 is a plan view and FIGS. 24A and 24B are side views showing another embodiment of the backlight unit of the liquid crystal display device according to the invention;

FIG. 25 is a plan view and FIGS. 25A and 25B are side views showing another embodiment of the backlight unit of the liquid crystal display device according to the invention;

FIG. 26 is a plan view and FIGS. 26A and 26B are side views showing another embodiment of the backlight unit of the liquid crystal display device according to the invention;

FIG. 27 is a plan view and FIGS. 27A and 27B are side views showing another embodiment of the backlight unit of the liquid crystal display device according to the invention;

FIG. 28 is a plan view and FIGS. 28A and 28B are side views showing another embodiment of the backlight unit of the liquid crystal display device according to the invention;

FIG. 29 is a plan view and FIGS. 29A and 29B are side views showing another embodiment of the backlight unit of the liquid crystal display device according to the invention;

FIG. 30 is a plan view and FIGS. 30A and 30B are side views showing another embodiment of the backlight unit of the liquid crystal display device according to the invention;

FIG. 32 is a plan view and FIG. 32A is a side view showing another embodiment of the backlight unit of the liquid crystal display device according to the invention;

FIG. 35 is a plan view and FIGS. 35A and 35B are side views showing another embodiment of the backlight unit of the liquid crystal display device according to the invention;

FIG. 36 is a plan view and FIGS. 36A and 36B are side views showing another embodiment of the backlight unit of the liquid crystal display device according to the invention;

FIG. 37 is a plan view and FIGS. 37A and 37B are side views showing another embodiment of the backlight unit of the liquid crystal display device according to the invention;

FIG. 38 is a plan view and FIGS. 38A and 38B are side views showing another embodiment of the backlight unit of the liquid crystal display device according to the invention;

FIG. 39 is a longitudinal view showing another embodiment of a discharge tube to be provided in the backlight unit of the liquid crystal display device according to the invention, FIG. 39A is an enlarged sectional view of the area A in FIG. 39, and FIG. 39B is a diagram illustrating insertion of the glass tube;

FIG. 40 is a longitudinal view showing another embodiment of a discharge tube to be provided in the backlight unit of the liquid crystal display device according to the invention, and FIG. 40A is an enlarged sectional view of the area A in FIG. 40; and FIG. 41 is a plan view and FIGS. 41A and 41B are side views showing another embodiment of the backlight unit of the liquid crystal display device according to the invention.

DETAILED DESCRIPTION OF THE PREFERRED EMBODIMENTS

Preferred embodiments of a liquid crystal display device according to the invention will be described below with reference to the accompanying drawings.

Embodiment 1

Figure 1:
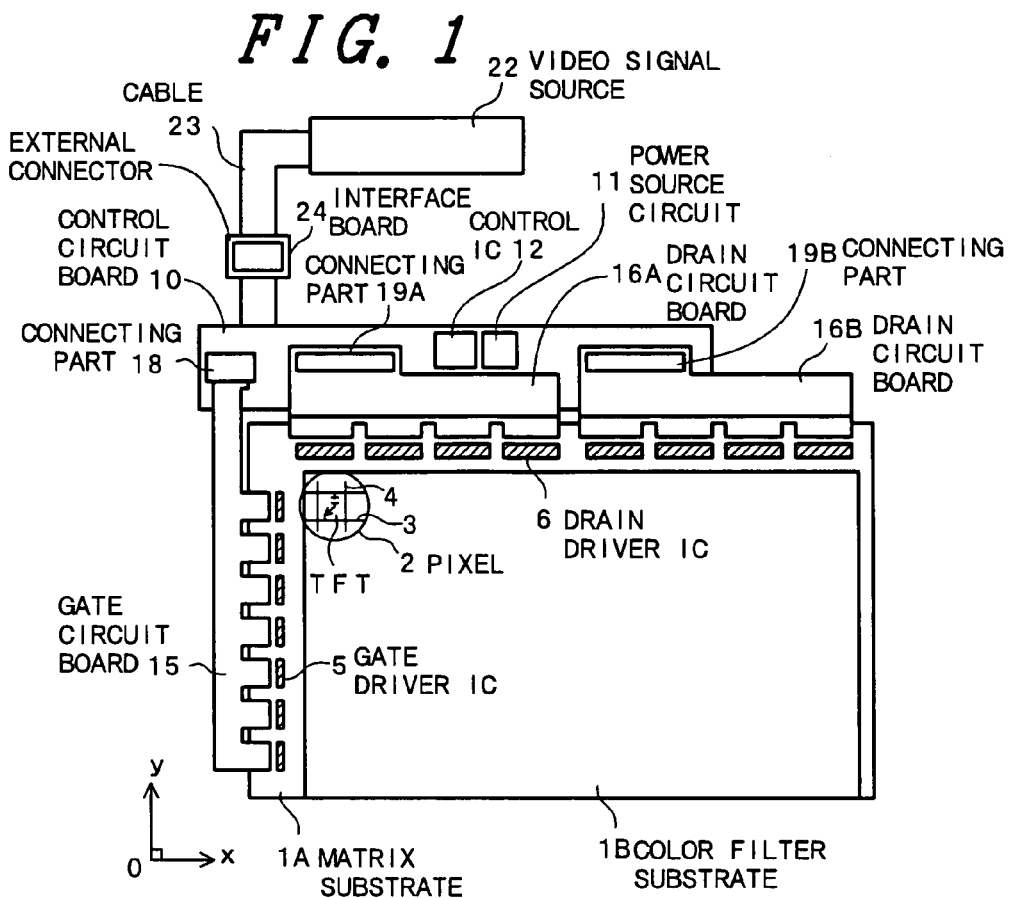
FIG. 1 is a diagram showing one embodiment of the liquid crystal display panel according to the invention.

FIG. 1 is an equivalent circuit diagram showing one embodiment of a liquid crystal display panel according to the invention. FIG. 1 is a circuit diagram which is depicted to correspond to an actual geometrical arrangement of the liquid crystal display panel.

In embodiment 1, the invention is applied to a liquid crystal display device of the type which employs a so-called in-plane-switching mode, which is a known operating mode having the advantage of providing a wide viewing angle.

FIG. 1 shows a liquid crystal display panel 1 that has a pair of transparent substrates 1A and 1B disposed so as to be opposed to each other with a liquid crystal material being interposed therebetween. In this case, one of the transparent substrates (in FIG. 1, a lower substrate: the matrix substrate 1A) is formed to be slightly larger in size than the other transparent substrate (in FIG. 1, an upper substrate: the color filter substrate 1B).

As shown in FIG. 1, the transparent substrates 1A and 1B are disposed in such a manner that the bottom and right peripheral edges of one of the transparent substrates 1A and 1B approximately coincident with those of the other substrate. Accordingly, as viewed in FIG. 1, the left and the top peripheries of the transparent substrate 1A are disposed so as to extend outwardly from those of the other transparent substrate 1B. As will be described later in detail, the portion of the transparent substrate 1A that extends outwardly from the transparent substrate 1B is used as an area in which the gate driver circuits 5 and drain driver circuits 6 are mounted.

Pixels 2 are disposed in matrix form in the area in which the transparent substrates 1A and 1B are superposed on each other. Scanning signal lines 3 are disposed so as to extend in the x direction and to be juxtaposed in the y direction as viewed in FIG. 1, while video signal lines 4 are disposed so as to extend in the y direction and to be juxtaposed in the x direction as viewed in FIG. 1. The respective pixels 2 are formed in areas which are each surrounded by adjacent ones of the scanning signal lines 3 and adjacent ones of the video signal lines 4. Each of the pixels 2 is provided with at least a switching element TFT to be driven by the supply of a scanning signal from one of the adjacent scanning signal lines 3, and a pixel electrode to which a video signal is supplied from one of the adjacent video signal lines 4 via this switching element TFT.

In Embodiment 1, each of the pixels 2 is of the type which adopts the so-called in-plane-switching mode, as described above, and is also provided with a counter electrode and an added capacitance element, in addition to the switching element TFT and the pixel electrode, as will be described later. Each of the scanning signal lines 3 has one end (in FIG. 1, the left end) which extends to the outside of the transparent substrate 1B and is connected to the output terminal of the corresponding one of the gate driver circuits (ICs) 5 mounted on the transparent substrate 1A. In this case, plural gate driver circuits 5 are provided, and mutually adjacent ones of the scanning signal lines 3 are grouped and each of the grouped scanning signal lines 3 is connected to the proximate one of the gate driver circuits 5.

Similarly, each of the video signal lines 4 has one end (in FIG. 1, the top end) which extends to the outside of the transparent substrate 1B and is connected to the output terminal of the corresponding one of the drain driver circuits (IC) 6 mounted on the transparent substrate 1A. In this case, plural drain driver circuits 6 are provided, and mutually adjacent ones of the video signal lines 4 are grouped and each of the grouped video signal lines 4 is connected to the proximate one of a corresponding one of the drain driver circuits 6.

A control circuit board 10 is disposed in proximity to the liquid crystal display panel 1 on which the gate driver circuits 5 and the drain driver circuits 6 are amounted in the above-described manner, and a control circuit 12 for supplying input signals to the gate driver circuits 5 and the drain driver circuits 6 is mounted on the control circuit board 10, and addition to a power supply circuit 11 and others. Signals from the control circuit 12 are supplied to the gate driver circuits 5 and the drain driver circuits 6 via flexible printed wiring boards (a gate circuit board 15, a drain circuit board 16A and a drain circuit board 16B). Specifically, a flexible printed wiring board (the gate circuit board 15), which is provided with terminals oppositely connected to the input terminals of the respective gate driver circuits 5, is arranged on the side of the gate driver circuits 5.

A portion of the gate circuit board 15 is formed so as to extend to the control circuit board 10, and the gate circuit board 15 is connected to the control circuit board 10 via a connecting part 18 at the extended portion. The output signals from the control circuit 12 mounted on the control circuit board 10 are inputted to respective gate driver circuits 5 via interconnection layers on the control circuit board 10, the connecting part 18 and the interconnection layers on the gate circuit board 15.

The drain circuit boards 16A and 16B, each of which is provided with terminals oppositely connected to the input terminals of the respective drain driver circuits 6, are disposed on the side of the drain driver circuits 6. Portions of the drain circuit boards 16A and 16B are formed so as to extend to the control circuit board 10 and are connected to the control circuit board 10 via connecting parts 19A and 19B at the extended portions, respectively.

The output signals from the control circuit 12, which is mounted on the control circuit board 10, are inputted to the drain circuit boards 16A and 16B via the interconnection layers on the control circuit board 10, the respective connecting parts 19A and 19B, and interconnection layers on the respective drain circuit boards 16A and 16B. The drain circuit boards 16A and 16B on the side of the drain driver circuits 6 are provided as two separate circuit boards, as shown in FIG. 1. This is intended to prevent, for example, harmful effects caused by thermal expansion due to an increase, in the x direction of FIG. 1, in the length of either of the drain circuit boards 16A or 16B, which would result in an increase in the overall size of the liquid crystal display panel 1.

The output signals from the control circuit 12 mounted on the control circuit board 10 are inputted to the corresponding drain driver circuits 6 via the connecting part 19A of the drain circuit board 16A and the connecting part 19B of the drain circuit board 16B. In addition, a video signal is supplied form a video signal source 22 to the control circuit board 10 through a cable 23 via an interface circuit board 24, and is inputted to the control circuit 12 mounted on the control circuit board 10.

In FIG. 1, the liquid crystal display panel 1, the gate circuit board 15, the drain circuit boards 16A and 16B and the control circuit board 10 are shown as being position in approximately the same plane. Actually, the control, circuit board 10 is bent at a portion where the gate circuit board 15 and the drain circuit boards 16A and 16B are mounted, and it is positioned at approximately right angles to the liquid crystal display panel 1. This construction is intended to reduce the area of the so-called frame. The term "frame" as used herein means the area between the outline of the outer frame of the liquid crystal display device and the outline of its display part. By reducing this frame area, it is possible to obtain the advantage of increasing the area of the display part with respect to the outer frame.

Figure 2:
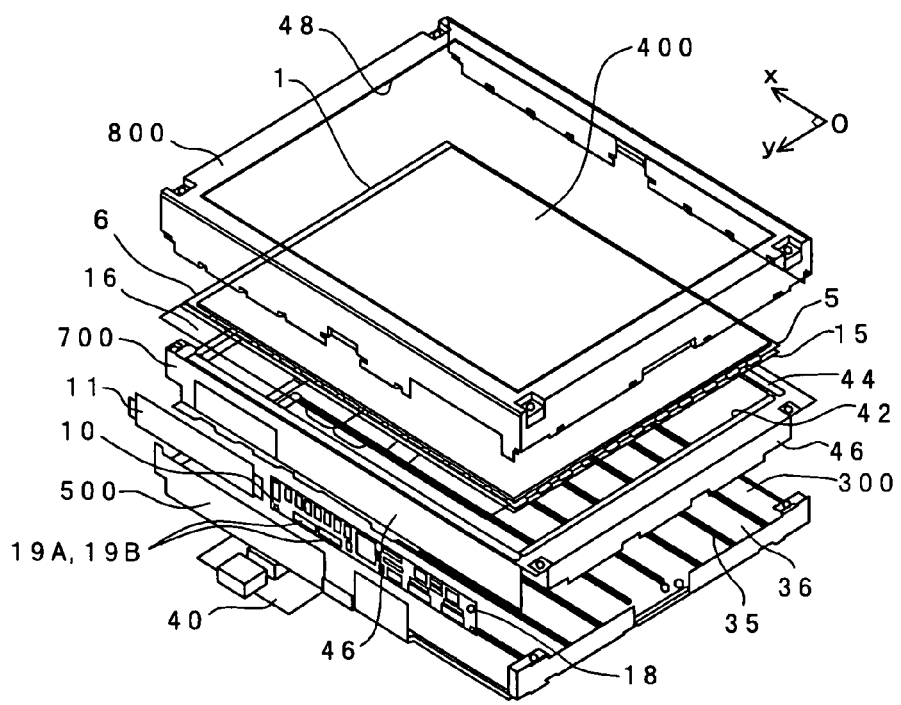
FIG. 2 is an exploded perspective view showing on embodiment of the liquid crystal display device according to the invention.

FIG. 2 is an exploded perspective view showing one embodiment of a module of a liquid crystal display device according to the invention.

The liquid crystal display device shown in FIG. 2 includes major parts, such as a liquid crystal display panel module 400, a backlight unit 300, a resin frame 500, and inside frame 700 and an upper frame 800, all of which are assembled in a modular form. Incidentally, in this embodiment, a reflector which constitutes part of the backlight unit 300 is formed at the bottom of the resin frame 500. The resin frame 500 and the backlight unit 300 are difficult to physically distinguish from each other, but an be functionally distinguished as described above. These members will be described below in order.

This liquid crystal display panel module 400 includes the liquid crystal display panel 1, the gate driver ICs5 and the drain driver ICs 6 which are respectively made of plural semiconductor ICs mounted on the periphery of the liquid crystal display panel 1, and the flexible gate circuit board 15 and a drain circuit boards 16 (16A and 16B), which are connected to the corresponding ones of the driver ICs 5 and 6. Specifically, the output from the control circuit board 10, which will be described later in more detail, is inputted to the gate driver ICs 5 and the drain driver ICs6 on the liquid crystal display panel 1 via the gate circuit board 15 and the drain circuit boards 16A and 16B, respectively, and the outputs from the gate driver ICs 5 and the drain driver ICs6 are inputted to the corresponding ones of the scanning signal lines 2 and the video signal lines 3 of the liquid crystal display panel 1.

Figure 3:
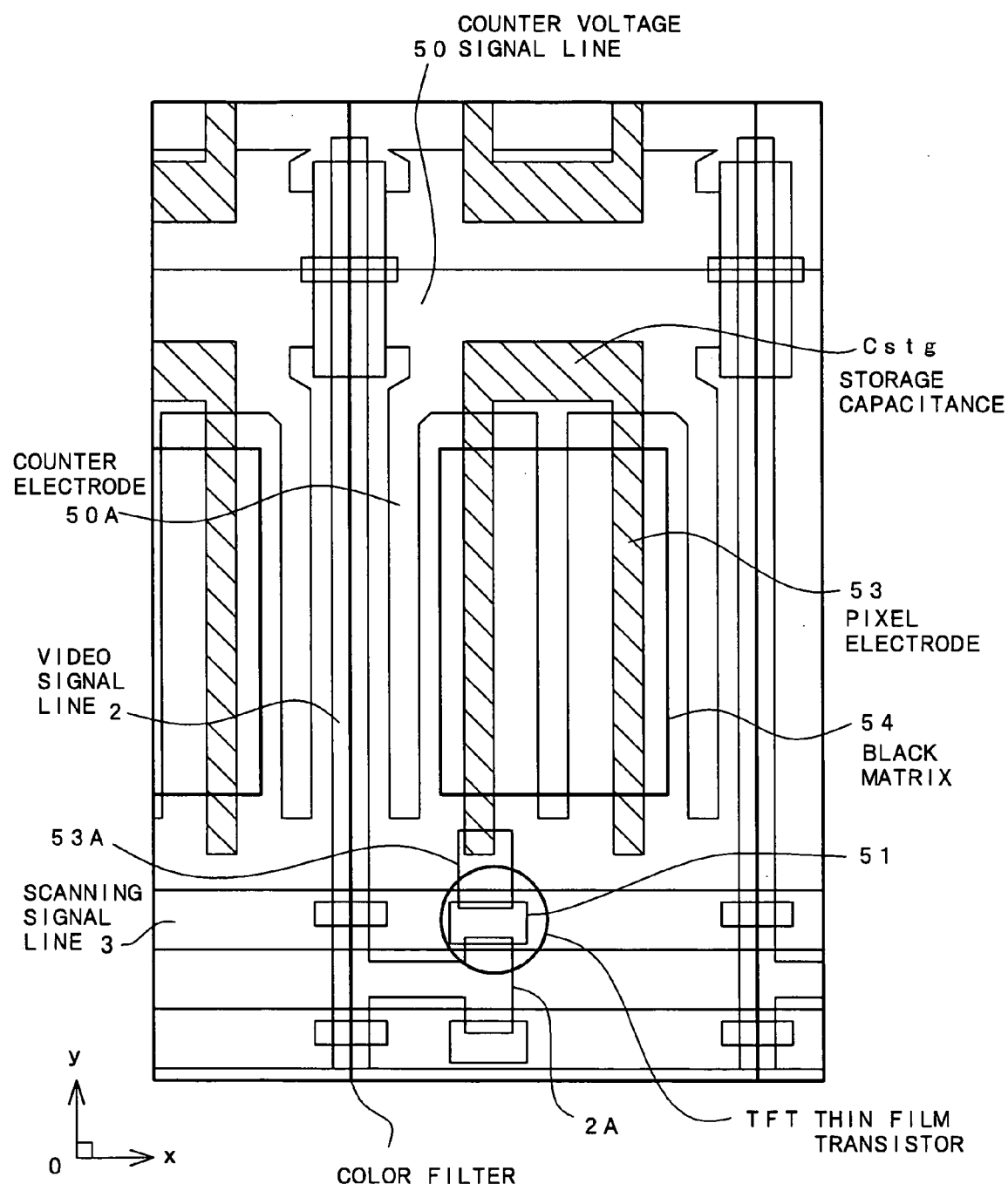
FIG. 3 is a plan view showing one embodiment of a pixel of the liquid crystal display device according to the invention.

The liquid crystal display panel 1 has a display area part which is made up of multiple pixels disposed in matrix form, as described above, and one of these pixels is shown in FIG. 3. Referring to FIG. 3, the scanning signal lines 3 and counter voltage signal lines 50 are formed so as to extend in the x direction on the main surface of the matrix substrate 1A. As shown in FIG. 3, the area which is surrounded by the signal lines 3 and 50, as well as the video signal lines 4, which are formed so as to extend in the y direction, as will be described later, is formed as a pixel area. In other words, in this embodiment, the counter voltage signal line 50 is formed to run between the adjacent scanning signal lines 3, and pixel areas are respectively formed to extend the ±y directions from the counter voltage signal line 50. With this construction, it is possible to reduce the number of the counter voltage signal lines 50 juxtaposed in the y direction to approximately half of the conventionally required number, whereby it is possible to assign the areas occupied by the counter voltage signal lines 50 to the pixel areas and increase the total area of the pixel areas.

In each of the pixel areas, for example, three counter electrodes 50A, which are disposed so as to extend in the y direction, are formed at equal intervals integrally with the counter voltage signal line 50. These counter electrodes 50A are not connected to, but extend to positions close to, the scanning signal line 3, and two outside ones of the counter electrodes 50A are disposed adjacent to the respective video signal lines 3, while the remaining one is positioned in the center between the two outside ones.

Furthermore, an insulating film made of, for example, silicon nitride is formed to cover the scanning signal lines 3, the counter voltage signal lines 50 and the counter electrodes 50A on the main surface of the transparent substrate 1A on which these scanning signal lines 3 and the like are formed in the above-described manner. This insulating film functions as an interlayer insulating film for insulating the video signal lines 2 (to be described later) from the scanning signal lines 3 and the counter voltage signal line 50, and it also functions as a gate insulating film for the thin film transistor TFT and has a dielectric film for a storage capacitor Cstg.

On the surface of the insulating film, a semiconductor layer 51 is formed on an area in which the thin film transistor TFT is formed. This semiconductor layer 51 is made of, for example, amorphous Si, and is formed to be superposed on the scanning signal line 3 in a portion close to one of the video signal lines 2, which will be described later. Thus, part of the scanning signal line 3 serves as the gate electrode of the thin film transistor TFT.

The video signal lines 2 which extend in he y direction and are juxtaposed in the x direction are formed on the surface of the insulating film. Each of the video signal lines 2 is integrally provided with a drain electrode 2A which is formed so as to extend to a portion of the surface of the semiconductor layer 51 which constitutes the thin film transistor TFT.

Furthermore, a pixel electrode 53, which is connected to a source electrode 53A of the thin film transistor TFT, is formed on the surface of the insulating film in the pixel area. This pixel electrode 53 is formed so as to extend in the y direction in the center between each of the counter electrodes 50A. Specifically, one end of the pixel electrode 53 also serves as the source electrode 53A of the thin film transistor TFT. The pixel electrode 53 extends in the y direction toward the counter voltage signal line 50, further extends in the x direction along the counter voltage signal line 50, and again extends in the y direction so as to form a C-like shape.

The portion of the pixel electrode 53 which is superposed on the counter voltage signal line 50 constitutes a portion of the storage capacitor Cstg, which uses the above-described insulating film that is disposed in the region between the pixel electrode 53 and the counter voltage signal line 50 as its dielectric film. The storage capacitor Cstg provides the effect of storing video information in the pixel electrode 53 for a long time, for example, when the fin film transistor TFT is off.

The surface of the semiconductor layer 51, which corresponds to the interface between the drain electrode 2A and the source electrode 53A of the thin film transistor TFT, is doped with phosphorus (P) to form a high-concentration layer, thereby providing ohmic contact at each of the drain electrode 2A and the source electrode 53A. The high-concentration layer is formed on the entire surface of the semiconductor layer 51, and after the drain electrode 2A and the source electrodes 53A have been formed, these electrodes 2A and 53A are used as a mask to etch the high-concentration layer, except in the area where the electrodes 2A and 53A are formed, thereby forming the above-described construction.

Then, a protective film made of, for example, silicon nitride is formed on the upper surface of the insulating film on which the thin film transistors TFT, the video signal lines 2, the pixel electrodes 53 and the storage capacitors Cstg are formed in the above-described manner, and an alignment film is formed on the upper surface of the protective film to constitute a so-called lower substrate of the liquid crystal display panel 1.

Although not shown, a black matrix (denoted by reference numeral 54 in FIG. 3), which has apertures in portions corresponding to the respective pixel areas, is formed in a liquid-crystal-side portion of the transparent substrate (color filter substrate) 1B, which constitutes a so-called upper substrate. Furthermore, color filters are formed to cover the apertures formed in the portions of the black matrix 54 which correspond to the respective pixel areas. These color filters have colors which differ between adjacent pixel areas in the x direction, and the respective color filters have boundaries on the black matrix 54.

A flat film made of resin film or the like is formed over the surface on which the black matrix 54 and the color filters are formed in this manner, and an alignment film is formed on the surface of the flat film.

Figure 4:
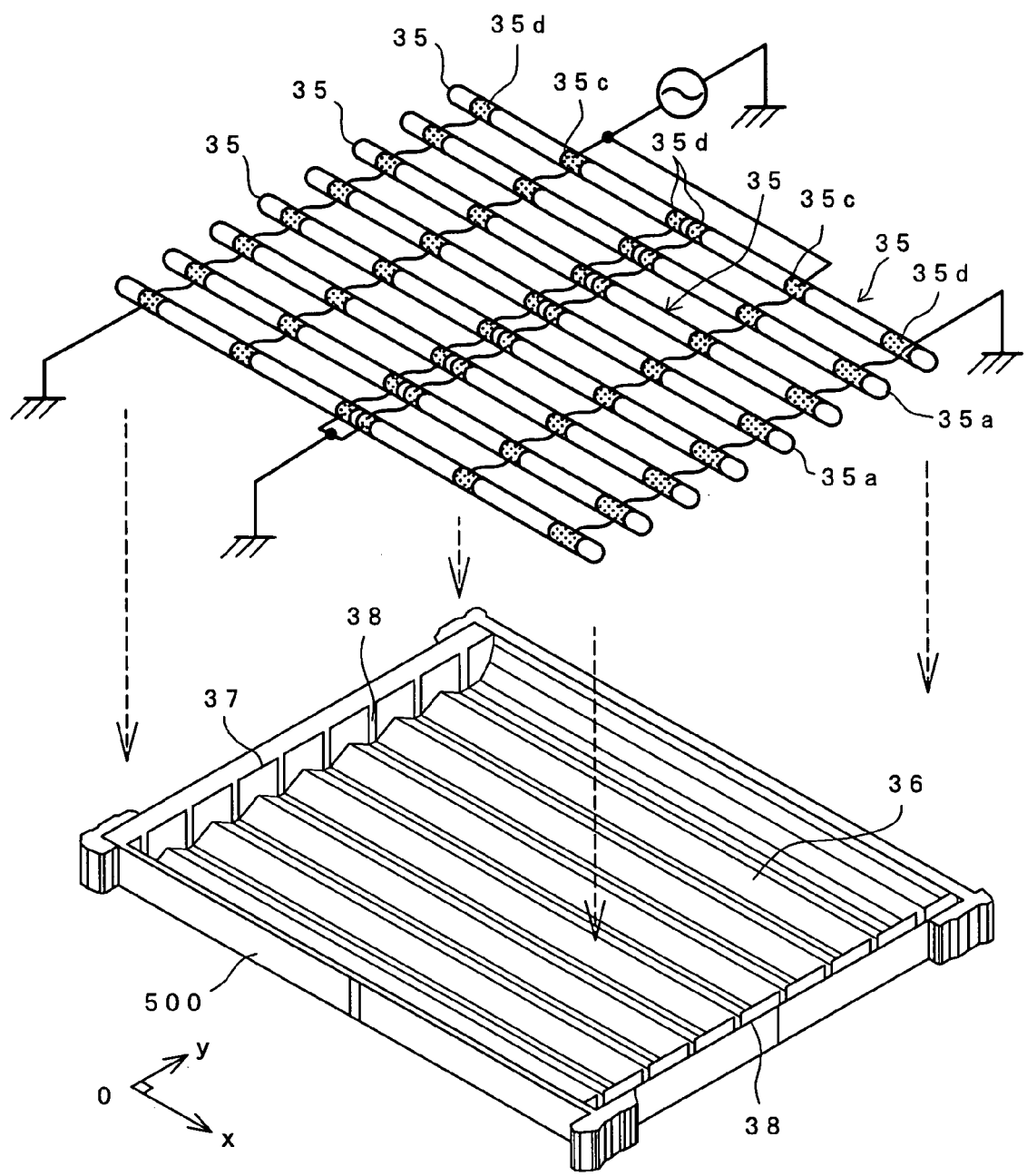
FIG. 4 is an exploded perspective view showing one embodiment of a backlight of the liquid crystal display device according to the invention.

The backlight unit 300 is disposed on the back side of the liquid crystal display panel module 400. This backlight unit 300 is a so-called direct backlight; and, it includes, as shown in detail in FIG. 4, plural (in FIG. 4, eight) linear light sources 35 disposed so as to extend in the x direction and to be juxtaposed in the y direction in such a manner as to be spaced equally apart from one another, and a reflector 36 for irradiating the liquid crystal display panel module 400 with light from these light sources 35.

This reflector 36 is formed in a shape which is wavy in the juxtaposed direction (y direction) of the light sources 35. Specifically, the reflector 36 has concave portions, each of which is arc-shaped in cross section, at locations where the respective light sources 35 are disposed, and convex portions, each of which is slightly acute between adjacent ones of the light sources 35, whereby the reflector 36 has a shape capable of efficiently irradiating the liquid crystal display panel module 400 with light from all of the light sources 35.

In this case, the reflector 36 has sidewalls 37 provided along opposite sides perpendicular to the longitudinal direction of the light sources 35, and the opposite ends of each of the light sources 35 are fitted in corresponding ones of flits 38, which are formed in the sidewalls 37, whereby the paths of the light from the light sources 35 in the juxtaposition direction thereof are restricted.

Each of the light sources 35 includes a discharge tube 35a and, for example, six electrodes fitted on the periphery of the discharge tube 35a; and, these electrodes are spaced by a predetermined distance apart from one another along the axial direction of the discharge tube 35a. Each of the electrodes is made of, for example, a ring-shaped aluminum foil, and the discharge tube 35a is inserted through the rings of the respective electrodes. In Embodiment 1, means for securing each of the electrodes to the discharge tube 35a is absent, whereby the position of each of the electrodes with respect to the discharge tube 35a can be corrected to a small extent in the axial direction thereof. The advantage of this construction will be described later in detail.

The electrodes of each of the light sources 35 are respectively connected to the corresponding electrodes of the adjacent one by conductive lines so that some of the electrodes are grounded and others are supplied with electricity. In other words, the light sources 35 are electrically connected so that they are supplied with electricity in parallel.

Figure 5:
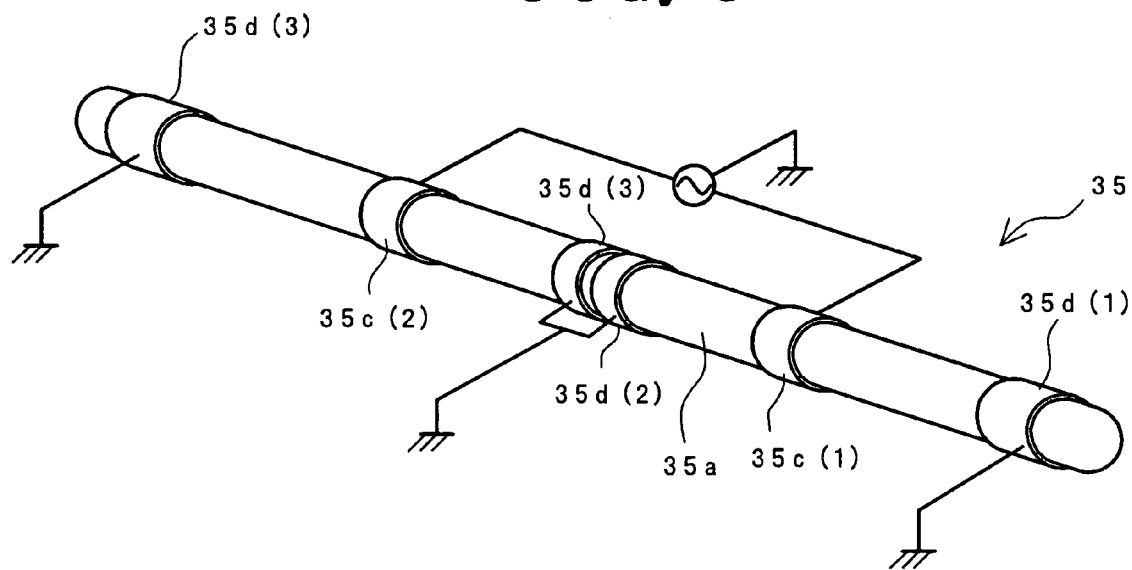
FIG. 5 is a perspective view showing one embodiment of a light source to be incorporated into the backlight of the liquid crystal display device according to the invention.

FIG. 5 is a perspective view showing the detailed construction of one of the light sources 35. As shown in FIG. 5, ground-side electrodes 35d are provided at approximately the middle of the discharge tube 35a and at the opposite ends thereof, and high-voltage-side electrodes 35c are provided between pairs of the ground-side electrodes 35d. The ground-side electrode 35d, which is positioned at the middle of the discharge tube 35a, is formed of two electrodes which are electrically separated from each other, and the two electrodes of each of the discharge tubes 35a are respectively connected to the corresponding electrodes of the adjacent one by conductive lines, and the conductive lines are connected to each other and are grounded.

Figures 6A, 6B:
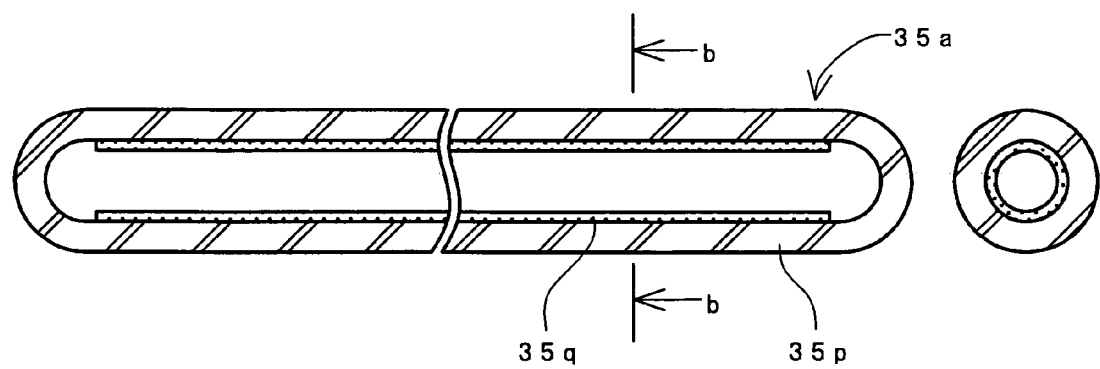
FIGS. 6A and 6B are cross-sectional views respectively showing longitudinal and transverse cross sections of a discharge tube which constitutes the light source of the liquid crystal display device according to the invention.

FIG. 6A is a cross-sectional view showing the construction of the discharge tube 35, and FIG. 6B is a cross-sectional view taken along line b—b of FIG. 6A. A glass tube 35p has a cylindrical shape that is closed at its opposite ends (for example, 2.6 mm in outer diameter, 2.0 mm in inner diameter, and 390 mm in length), and the inner wall surface of the glass tube 35p is coated with a phosphor 35q. A Ne+Ar (5%) mixed gas having a gas pressure of 60 Torr and mercury are sealed in the glass tube 35p.

In the case of the light source 35 having the above-described construction shown in FIG. 5, when, for example, a sinusoidal high-frequency voltage of several MHz (1.5 MHz or more) and approximately 800 Vp-p is applied to the high-voltage-side electrodes 35c, a discharge is generated in the discharge tube 35a, and ultraviolet rays generated from the discharge strike the phosphor 35q to generate visible light.

In this case, the discharge is generated between the ground-side electrode 35d(1) and the high-pressure-side electrode 35c(1), as well as between the high-pressure-side electrode 35c(1) and the ground-side electrode 35d(2), as viewed from one end of the discharge tube 35a, and between the ground-side electrode 35d(3) and the high-pressure-side electrode 35c(2), as well as between the high-pressure-side electrode 35c(2) and the ground-side electrode 35d(3), as viewed from the other end of the discharge tube 35a.

In this case, since it is not the high-voltage-side electrodes 35c, but the ground-side electrodes 35d, that are respectively disposed at the opposite ends of the discharge 35a, the efficiency of discharge can be increased. The reason for this is that, if the high-voltage-side electrodes 35c are respectively disposed at the opposite ends of the discharge tube 35a, only high-frequency electric fields generated on one side (on a side adjacent to the ground-side electrode) contribute to the discharge, and high-frequency electric fields generated on the other sides (on the opposite end sides of the discharge tube 35(a) are wasted. In other words, the waste of energy can be prevented by disposing the ground-side electrodes 35d on the opposite sides of each of the high-voltage-side electrodes 35c, whereby it is natural to adopt a construction in which the respective ground-side electrodes 35d are disposed at the opposite ends of the discharge tube 35a.

As described above, the ground-side electrode 35d disposed in the middle of the discharge tube 35a is formed of two electrodes 35d(2) and 35d(3) which are electrically separated from each other. The reason for this is that, if the ground-side electrode 35d is made of one electrode instead of two electrodes which are electrically separated from each other, there may occur the phenomenon that a strong discharge is generated between the ground-side electrode 35de and either one of the high-voltage-side electrodes 35c(1) and 35c(2) which are disposed adjacent to the ground-side electrode 35d. For this reason, the ground-side electrode disposed between the high-voltage-side electrodes is constituted by separate electrodes which are respectively paired with the high-voltage-side electrodes, whereby a uniform discharge can be effected.

FIGS. 7A to 7C show data indicative of the axial distribution of the illuminance of the light source 35 constructed in the above-described manner. By way of example, FIGS. 7A to 7C show the case of a 390-mm-long discharge tube 390 having electrodes disposed as shown in FIG. 5. FIGS. 7A, 7B and 7C show the case of 800 Vp-p, the case of 900 Vp-p and the case of 1,000 Vp-p, respectively. As is apparent from these graphs, approximately uniform illuminance can be obtained, except in portions close to the respective electrodes.

Figure 8A:
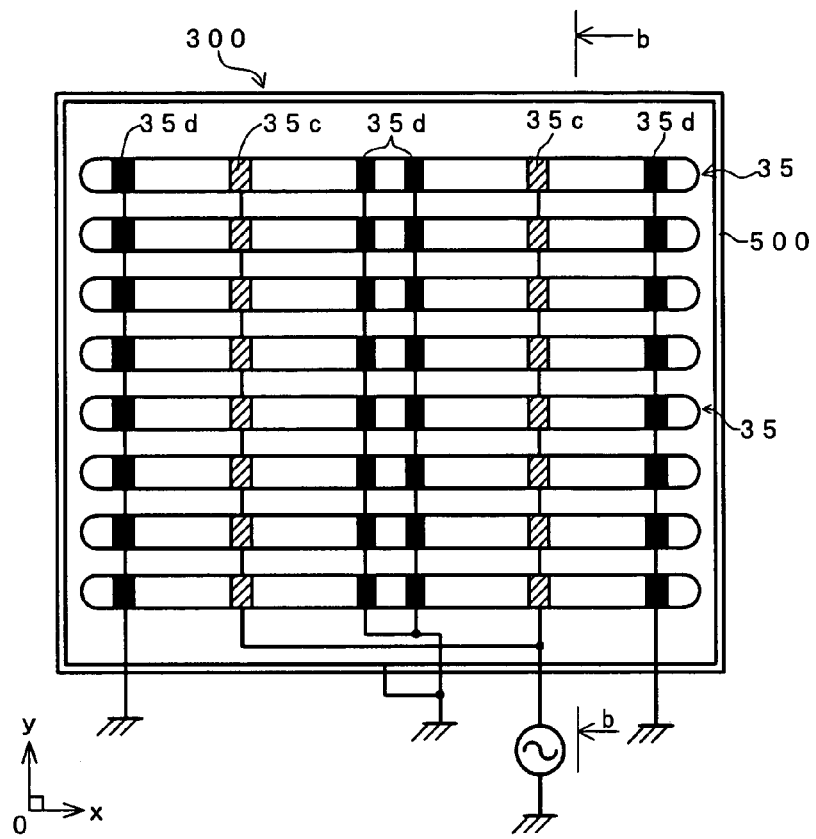
FIGS. 8A and 8B are a plan view and a cross-sectional view, respectively, showing one embodiment of the backlight of the liquid crystal display device according to the invention.
Figure 8B:
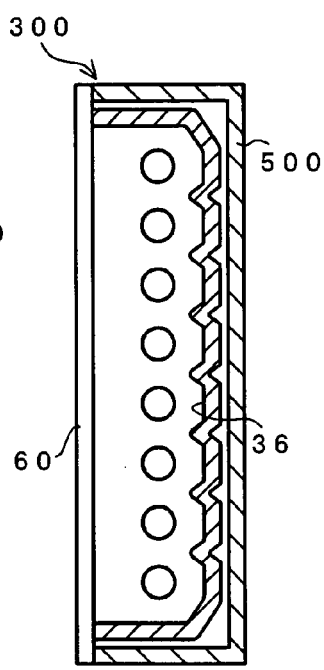

FIG. 8A is a plan view showing the backlight unit 300 observed from the side where the liquid crystal display unit 400 is disposed. FIG. 8B is a cross-sectional view taken along line b—b of FIG. 8A.

In the area of the backlight unit 300 that is opposed to at least the liquid crystal display unit 400, eight light sources 35, which linearly extend in the x direction as viewed in FIG. 8A, are juxtaposed so as to be spaced at nearly equal intervals in the y direction as viewed in FIG. 8A. Light from the light sources 35 is irradiated onto the liquid crystal display unit 400 directly or by being reflected by the reflector 36, whereby the backlight unit 300 serves the function of a surface light source.

In this case, there may be a risk that the light irradiation becomes non-uniform in the region between each of the adjacent light sources 35 and in the regions where the respective light sources 35 are formed. This disadvantage can be fully solved by a reflector 60 that is disposed so as to be interposed between the backlight unit 300 and the liquid crystal display unit 400. In this case, the reflector 60 need not necessarily be limited to the aforesaid type of reflector, and may use any kind of means that can make the illuminance of light that is irradiated onto the liquid crystal display panel 1 from the backlight unit 300 more uniform.

Figure 9:
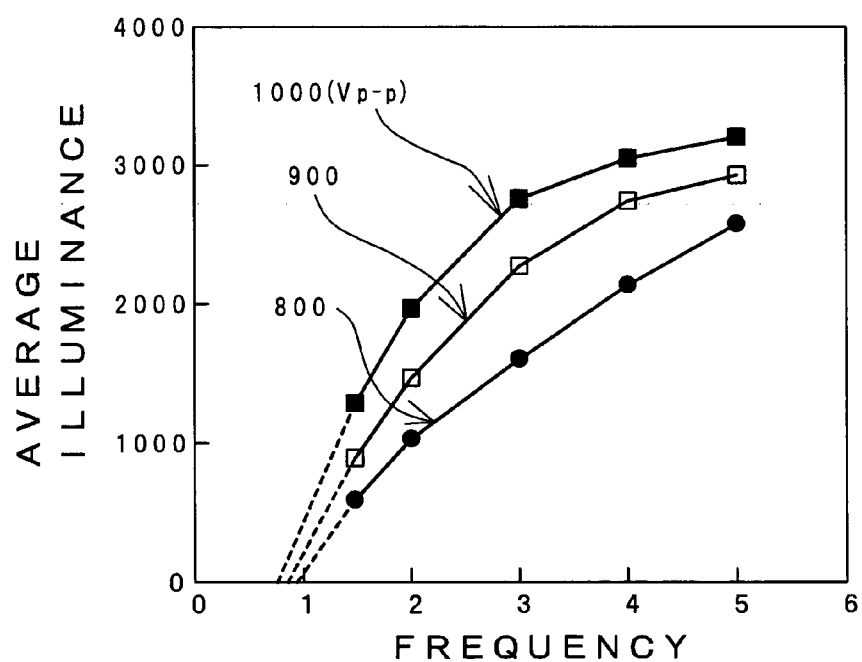
FIG. 9 is a graph showing the relationship between the frequency of a power source and the average illuminance of the backlight of the liquid crystal display device according to the invention.

FIG. 9 is a graph showing the relationships between the frequency of a power source and the average illuminance obtained through the reflector 60 in each of the examples shown in FIGS. 7A, 7B and 7C. As is apparent from this graph, as the frequency is increased, the average illuminance is improved.

As described above, in a backlight unit 300 constructed in this manner, in each of the light sources 35, the electrodes are disposed on the outer periphery of the discharge tube, that is to say, the electrodes are not formed in the discharge tube, whereby the mercury inside the tube can be prevented from being consumed owing to the external location of these electrodes. Accordingly, it is possible to lengthen the life of the light sources 35; and, it is, therefore, possible to extend the life of the liquid crystal display device.

In addition, as described above, the ground-side electrodes 35d and the high-voltage-side electrodes 35c of each of the light sources 35 can be moved with respect to the discharge tube 35a in the axial direction thereof, whereby by moving those electrodes 35d and 35c to a slight extent, it is possible by such an adjustment to make the illuminances between the high-voltage-side electrodes 35c and the ground-side electrodes 35d of each of the light sources 35 more uniform. It is, therefore, possible to obtain a backlight unit 300 having a uniform surface illuminance.

The resin frame 500 constitutes part of the outer frame of the liquid crystal display device that is assembled in a modular form, and it is constructed to accommodate the backlight unit 300. This resin frame 500 has the shape of a box having a bottom and sides, and a diffusing sheet (not shown) which is disposed to cover the backlight unit 300 can be supported on the upper ends of the sides.

The reflector has the function of diffusing light from each of the light sources 35 of the backlight unit 300, whereby uniform light having even brightness can be irradiated onto the liquid crystal display unit 400.

With this construction, the resin frame 500 is formed to be comparatively small in wall thickness. This is because the resultant decrease in the mechanical strength of the resin frame 500 can be compensated for by the inside frame 700, which will be described later. Incidentally, a high-frequency power source board (for example, an AC/AC inverter) 40 for supplying a high-frequency voltage to the light sources 35 can be secured to the back side of the res in frame 500. Connecting lines which extend from the high-frequency power source board 40 are connected to the high-voltage-side electrodes 35c and the ground-side electrodes 35d of each of the light sources 35.

Figure 10:
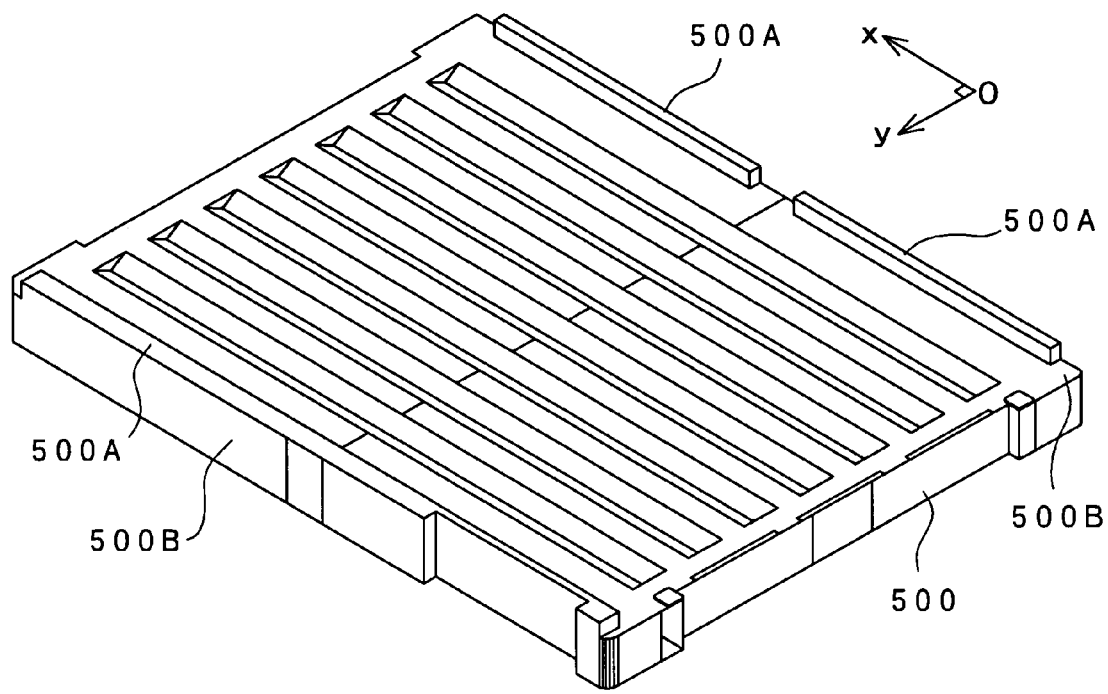
FIG. 10 is a perspective view showing one embodiment of a resin frame of the liquid crystal display device according to the invention.

FIG. 10 is a perspective view showing the reverse side of the resin frame 500, that is, the side of the resin frame 500 opposite to the side where the backlight unit 300 is disposed. As is apparent from FIG. 10, the resin frame 500 has projecting parts 500A which are formed to extend along the sides of the resin frame 500 that are parallel to the x direction as viewed in FIG. 10.

Specifically, the resin frame 500 is formed so that each of a pair of opposite sides (the sides parallel to the x direction) has a side portion 500B, which extends to the back side of the resin frame 500 as viewed from the observation side of the liquid crystal display device. The reason for this is that it makes it possible to obtain the advantage that the resin frame 500 can be imparted with a strength that is resistant against twists due to reverse rotational forces on the diagonal lines of the resin frame 500, and it is also possible to impart sufficient strength to a case constituted by the combination of the resin frame 500 and the inside frame 700, which will be described later.

As will be apparent from a later description, each of the projecting parts 500A is formed to be greater in height that the high-frequency power source board 40, so that the projecting parts 500A are comparatively large. As described above, the control circuit board 10 is disposed so as to be closely opposed to one of the side portions 500B (actually, with the inside frame 700 interposed therebetween). Accordingly, it is possible to provide the advantage that the control circuit board 10, which is complicated in circuit construction, may be constructed as a large-sized circuit board. In this case, the control circuit board 10 also has the advantage of having an electromagnetic-wave shielding function, because the inside frame 700 is present between the liquid crystal display unit 400 and the control circuit board 10.

Incidentally, in this embodiment, the respective projecting parts 500A are provided on the sides parallel to the x direction, but the invention is not limited to such an arrangement. It goes without saying that, even if the projecting parts 500A are provided on the other sides parallel to the y direction, it is possible to obtain similar advantages.

Figure 11:
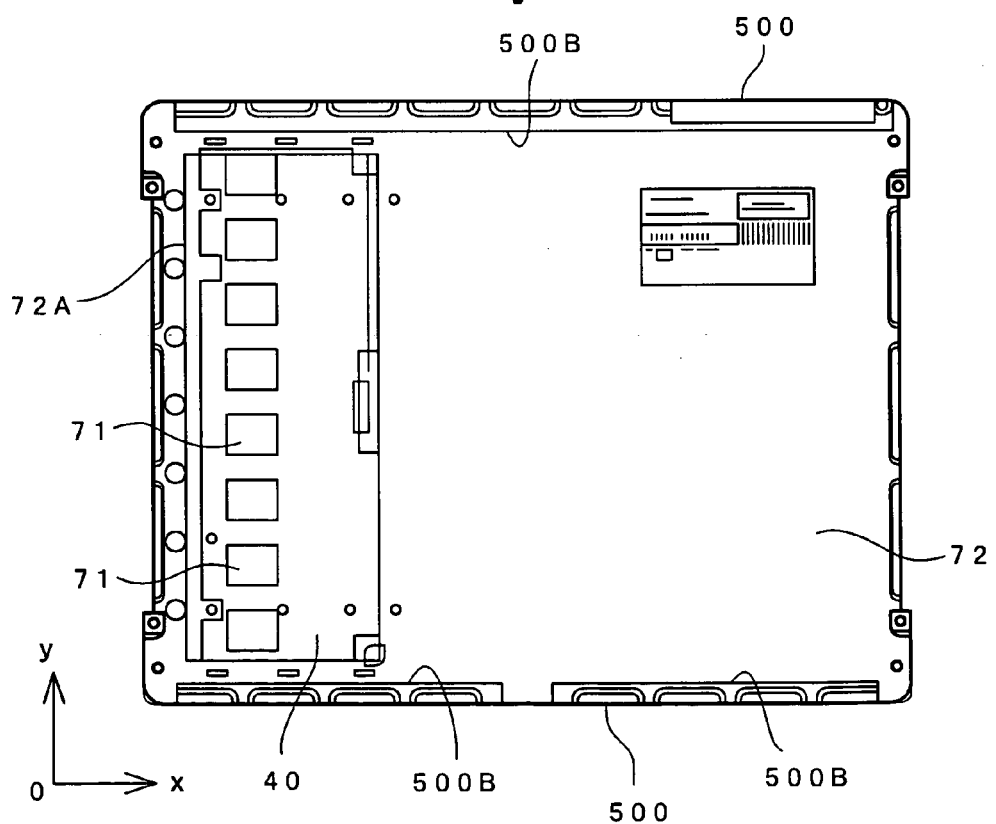
FIG. 11 is a plan view showing one embodiment of a high-frequency power source board disposed on the reverse side of the resin frame of the liquid crystal display device according to the invention.
Figure 12:
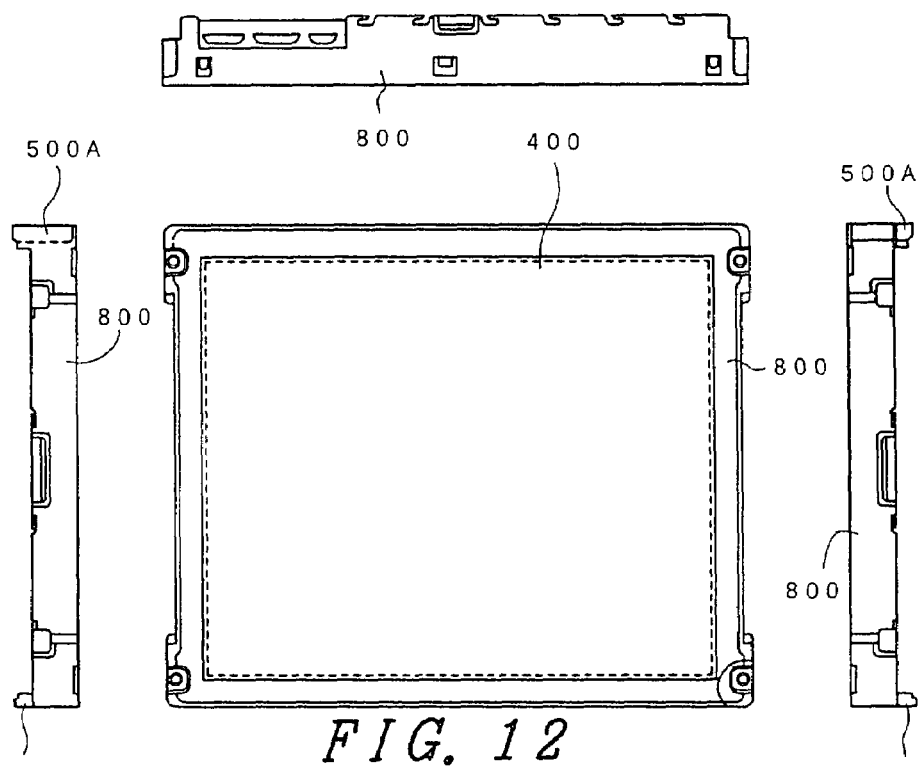

FIG. 11 is a view showing the high-frequency power source board 40 disposed on the reverse side of the resin frame 500. This high-frequency power source board 40 is provided with transformers 71, the number of which is equivalent to the number (in this embodiment, eight) of the light sources 35 of the backlight unit 300. However, the transformers 71 need not necessarily be disposed so that the number of the transformers 71 is equivalent to that of the light sources 35. It goes without saying that one transformer may be allocated to a set of two, four or eight light sources.

The high-frequency power source board 40 is disposed via the shield sheet 72, which is made of a metal and is secured to the reverse side of the resin frame 500, and an aperture 72A is provided in a portion of the shield sheet 72 (a portion approximately equivalent to the area in which the high-frequency power source board 40 is mounted). This is because it is necessary to prevent eddy currents from occurring in the shield sheet 72 owing to the transformers 71, and also because interconnection layers are formed on the high-frequency power source board 40 and the high-frequency power source board 40 itself has a shielding function.

The DC/AC inverter board 40 secured in this manner, inclusive of its mounted components, has a height which does not allow any of them to project from the projecting parts 500A of the resin frame 500. In other words, the projecting parts 500A of the resin frame 500 are set to be so high as not to allow the high-frequency power source board 40 including the mounted components to project from the projecting parts 500A of the resin frame 500.

The inside frame 700 is disposed between the liquid crystal display unit 400 and the diffusing sheet (not shown). This inside frame 700 is made of a metal plate which is comparatively thin in wall thickness and has an aperture 42 formed in a portion equivalent to the display area part of the liquid crystal display unit 400. The inside frame 700 has the function of pressing the diffusing sheet against the resin frame 500 and the function of enabling the liquid crystal display unit 400 to be mounted on the inside frame 700.

Spacers 44 for positioning a liquid crystal display panel 100 are secured to part of the upper surface of the inside frame 700 on which the liquid crystal display unit 400 is to be mounted. Owing to these spacers 44, the liquid crystal display panel 100 can be accurately positioned with respect to the inside frame 700.

The inside frame 700 has the shape of being formed integrally with sides 46, that is, the shape in which the aperture 42 is formed in the bottom of the metal plate having an approximately box-like shape. The inside frame 700 having this shape is fitted into the resin frame 500 with the diffusing sheet interposed therebetween. In other words, the inside frame 700 is placed in the resin frame 500 so that the inside walls of the sides 46 are respectively opposed to the outside walls of the sides of the resin frame 500.

The metal-plate inside frame 700 constructed in this manner constitutes one frame (case) together with the resin frame 500, and can improve the mechanical strength of the resin frame 500 without increasing the wall thickness thereof. That is to say, even if the inside frame 700 and the resin frame 500 are not sufficient in mechanical strength, their mechanical strength is improved by fitting the inside frame 700 into the resin frame 500 in the above-described manner, whereby the case has a strength that is resistant against twists about the diagonal lines.

In addition, the projecting parts 500A formed on the resin frame 500 serve to increase the mechanical strength against twists about the diagonal lines of the case. Accordingly, it is possible to obtain the advantage of ensuring a sufficient strength without enlarging the so-called picture frame area in the module of the liquid crystal display device. In addition, as compared with an approximately planar frame having no sides, the inside frame 700 in itself becomes large in mechanical strength, and has the advantage of becoming easy to handle during processes conducted prior to the assembling of the module.

Incidentally, in this embodiment, the control circuit board 10 and the DC/DC converter board 11 are disposed on part of the sides 46 of the inside frame 700 so as to be opposed to each other. In other words, the control circuit board 10 and the DC/DC converter board 11 are disposed perpendicularly to the liquid crystal display panel module 400, whereby the picture frame can be reduced in size. In this case, the control circuit board 10 is connected via the connecting parts 18, 19A and 19B, respectively, to the flexible gate circuit board 15, drain circuit board 16A and drain circuit board 16B secured to the liquid crystal display panel module 400, and the drain circuit board 16A and drain circuit board 16B are bent to form the above-described arrangement.

Incidentally, in this construction, as described previously, the influence of electromagnetic waves generated from the control circuit board 10 on other members can be prevented by the sides 46 of the inside frame 700.

In the above description of Embodiment 1, reference has been made to a box-like shape as the shape of the inside frame 700, but the shape of the inside frame 700 need not be a perfect box-like shape and may also be a shape having a side formed on at least one side. This is because the inside frame 700 is not planar, but has bent portions to constitute a structure which has a mechanical strength improved by the bent portions.

The upper frame 800 has the function of pressing the liquid crystal display panel module 400, the inside frame 700 and the diffusing sheet against the resin frame 500, and constitutes the outer frame of the module of the liquid crystal display device together with the resin frame 500. The upper frame 800 is made of a metal plate having an approximately box-like shape, and an aperture (display window) 48 is formed in the portion of the metal plate that is equivalent to the display area part of the liquid crystal display panel module 400. The upper frame 800 is secured to the resin frame 500, as by engagement. The upper frame 800 also has the function of a shielding material.

FIGS. 12A, 12B, 12C and 12D show an assembly of the components shown in FIG. 2. The central view of FIG. 12 is a plan view showing the assembly viewed from the side where the upper frame 800 is disposed, while FIGS. 12A to 12D show the right, left, top and bottom side views of FIG. 12, respectively.

As is apparent from the right and left views of FIGS. 12A and 12B, the high-frequency power source board 40 disposed on the reverse side of the resin frame 500 is disposed without projecting from the sides of the upper frame 800 (that is, it is in an unobservable state). As is also apparent from the right and left views of FIGS. 12A and 12B, the resin frame 500 has a C-like cross-sectional shape owing to the projecting parts 500A.

As described previously, the resin frame 500 has a large strength that is resistant against twists due to reverse rotational forces on the diagonal lines of the resin frame 500.

Embodiment 2

Figure 13:
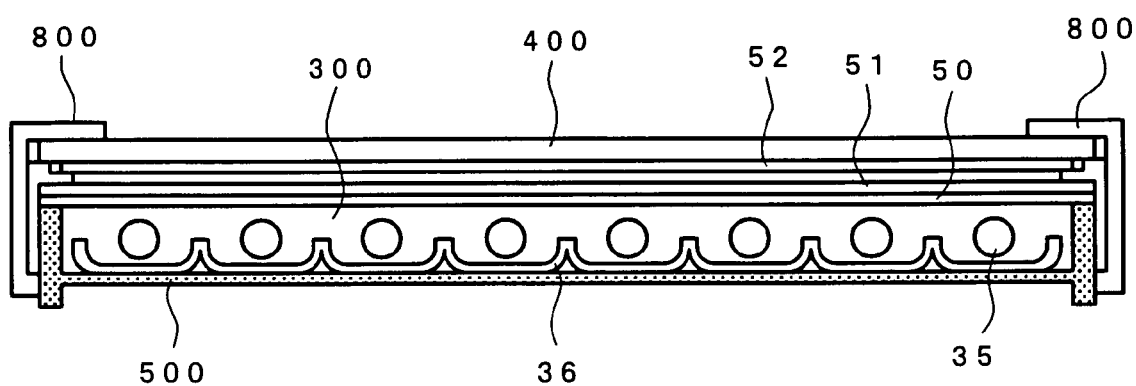
FIG. 13 is a cross-sectional view showing another embodiment of the liquid crystal display device according to the invention.

FIG. 13 is a cross-sectional view showing another embodiment of the liquid crystal display device according to the invention, the construction of which is improved with respect to, for example, the construction of Embodiment 1. FIG. 13 is a cross-sectional view of the assembly of the liquid crystal display device taken along the y direction (the direction perpendicular to the longitudinal direction of the light sources 35).

The construction of Embodiment 2 differs from that of Embodiment 1 in that, on the side of the backlight unit 300 that faces the liquid crystal display panel unit 400, a diffusing sheet 50 is disposed to cover the backlight unit 300, and an electromagnetic shield sheet 51 is disposed on the side of the diffusing sheet 50 that faces the liquid crystal display panel unit 400. This electromagnetic shield sheet 51 is a shield sheet for blocking electromagnetic waves generated from the light sources 35 of the backlight unit 300, and is made of, for example, a transparent conductive sheet or a metal mesh. With this construction, it is possible to solve a problem which results in disadvantages offered by the light sources 35 driven by a high-frequency voltage.

Incidentally, in this case, the reflector 36 of the backlight unit 300 may, of course, be formed of a metal material so that the reflector 36 can be given the function of the electromagnetic shield sheet 51 relative to the light sources 35.

In this embodiment, another diffusing sheet 52 is disposed on the side of the electromagnetic shield sheet 51 that faces the liquid crystal display panel unit 400, and it realizes together with the diffusing sheet 50 a structure which can make the irradiation of light onto the liquid crystal display panel unit 400 from the backlight unit 300 more uniform. The reason for this is that, as described previously, each of the light sources 35 has plural electrodes spaced apart from one another along its longitudinal direction, and so light irradiation is not effected in the portions of these electrodes. Furthermore, there exist lines which connect the electrodes of each of the light sources 35 to the corresponding electrodes of the adjacent light source, so that this becomes a cause of slight degradation of the uniformity of the light irradiation.

As shown in FIG. 13, the resin frame 500 is made of a metal material, and the electromagnetic shield sheet 51 is disposed in direct contact with the resin frame 500, whereby the light sources 35 can be completely shielded. For similar purposes, the reflector 36 may be made of a metal material and the electromagnetic shield sheet 51 may be disposed in direct contact with the reflector 36.

Embodiment 3

Figure 14A:
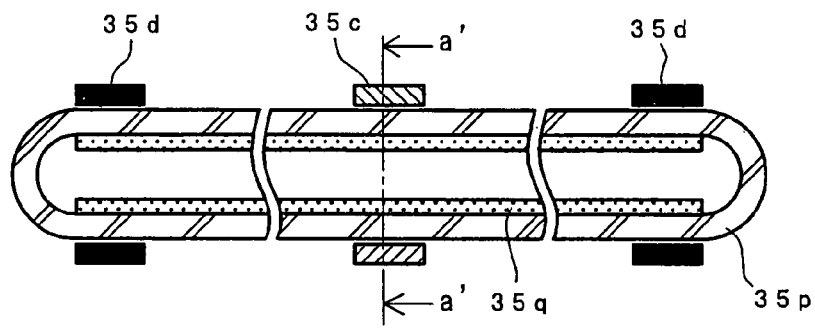
FIGS. 14A to 14C are longitudinal cross-sectional views and FIGS. 14A' to 14C' are corresponding transverse cross-sectional views taken along lines a'—a', b'—b', and c'—c' in FIGS. 14A to 14C, respectively, showing other embodiments of the light source of the liquid crystal display device according to the invention.
Figure 14A:
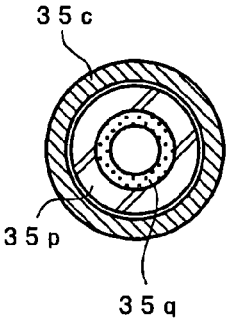
Figure 14B:
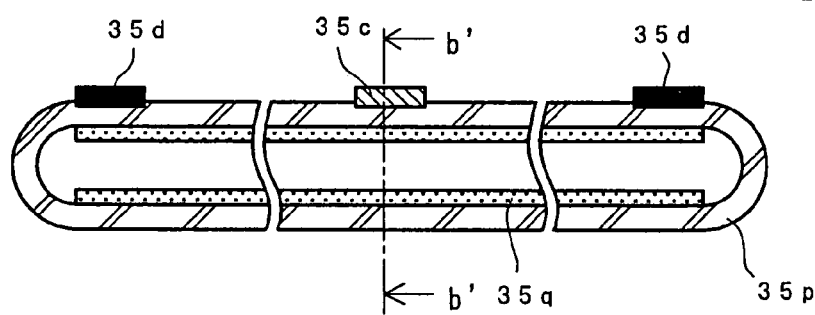
Figure 14B:
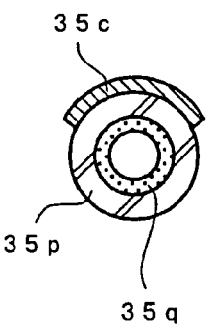
Figure 14C:
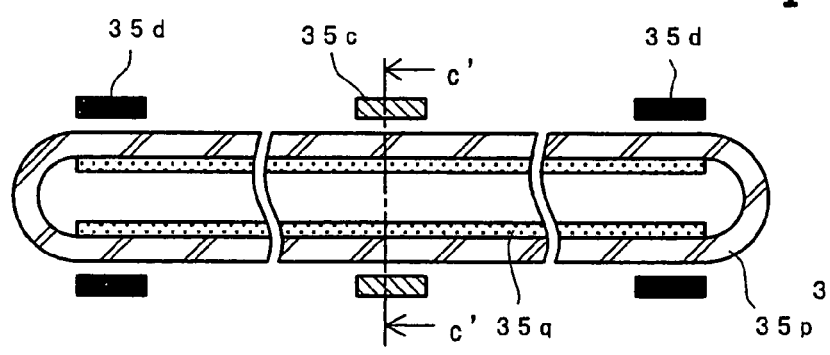
Figure 14C:
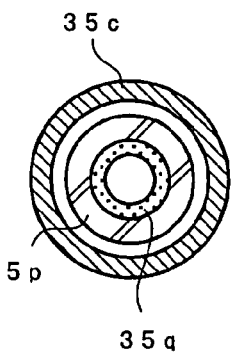

FIGS. 14A to 14C are longitudinal views showing the constructions of different modifications of each of the light sources 35 used in each of the above-described embodiments.

FIG. 14A is a view showing a modification similar to each of the light sources 35 used in each of the above-described embodiments. In the light source shown in FIG. 14A and FIG. 14A', the electrodes have ring-like shapes, and a discharge tube is inserted through these electrodes. FIG. 14A' is a cross-sectional view taken along line a'—a' of FIG. 14A.

In the light source shown in FIG. 14B and FIG. 14B', each of the electrodes is formed on part of the circumference of the discharge tube. Even with this construction, the function of the light source 35 can be similarly realized. FIG. 14B' is a cross-sectional view taken along line b'—b' of FIG. 14B.

In the light source shown in FIG. 14C and FIG. 14C', the electrodes have ring-like shapes similarly to the case shown in FIG. 14A, but a gap is formed between each of the electrodes and the discharge tube. Even with this construction, the function of the light source 35 can be similarly realized. FIG. 14C' is a cross-sectional view taken along line c'—c' of FIG. 14C.

Embodiment 4

Figure 15A:
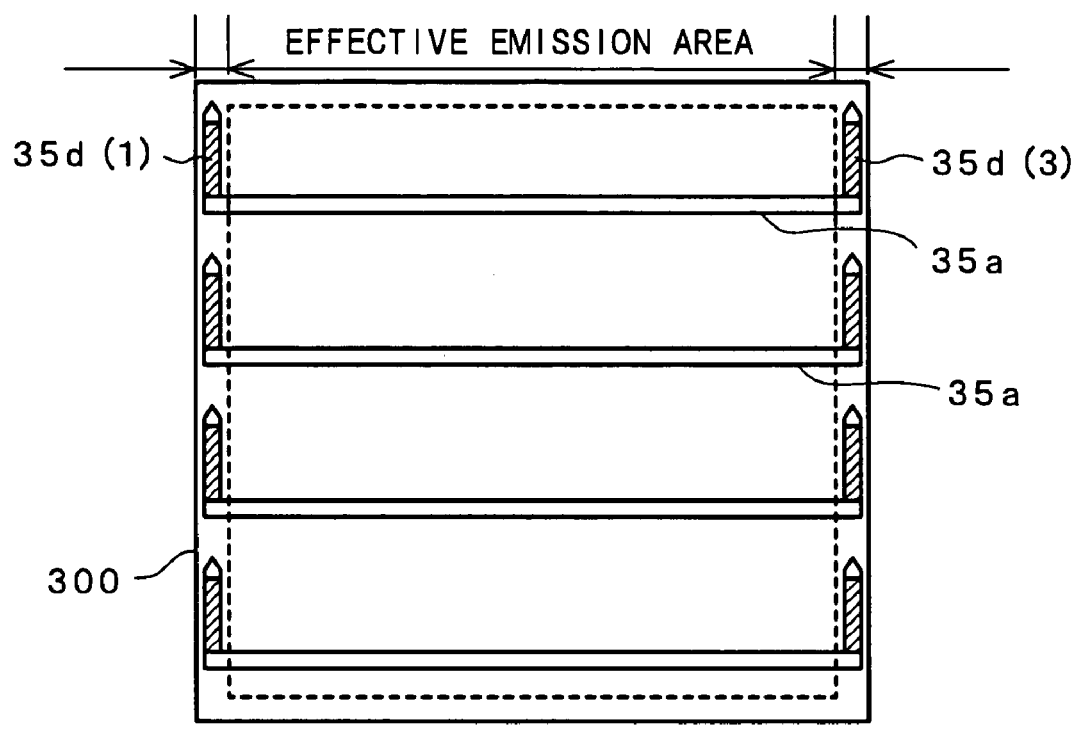
FIGS. 15A and 15B are plan and end view diagrams, respectively, showing the construction of another embodiment of the backlight unit of the liquid crystal display device according to the invention.
Figure 15B:
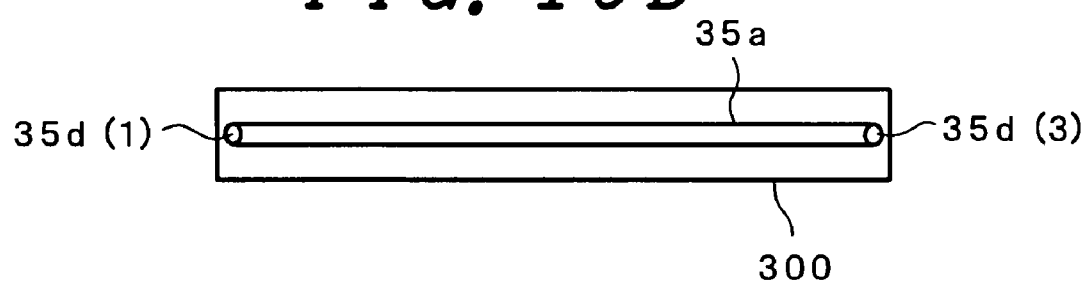

FIGS. 15A and 15B are views showing the construction of another embodiment of the liquid crystal display device according to the invention. Specifically, FIGS. 15A and 15B are a plan view and a side view showing the backlight un it 300, respectively.

As shown in FIGS. 15A and 15B, the portions of the electrodes 35d(1) and 35d(3) disposed at the opposite ends of each of the discharge tubes 35a provided in the backlight unit 300 are bent. More specifically, the opposite end portions of each of the discharge tubes 35a in which the respective electrodes 35d(1) and 35d(3) are formed are bent at 90° with respect to the central axis (or the extending direction) of the discharge tube 35a, and all the bending directions are made coincident with the upward direction, as viewed in FIG. 15A.

Incidentally, each of the discharge tubes 35a has electrodes disposed not only at the opposite ends, but also in the intermediate portion between the opposite ends, as described previously, but FIGS. 15A and 15B show only the electrodes 35d(1) and 35d (3) disposed at the opposite ends and do not show any of the electrodes disposed in the intermediate portion. However, it goes without saying that the invention can also be applied to a construction in which the electrodes 35d(1) and 35d(3) are disposed at only the opposite ends of each of the discharge tubes 35a.

Even if the bent portions are formed in part of the discharge tube 35a constructed in this manner, the bent portions do not impair the emission of the discharge tube 35a and the discharge tube 35a can emit a sufficient amount of light similarly to each of the discharge tubes 35a used in each of the above-described embodiments.

In this Embodiment 4, the area of each of the discharge tubes 35a which is occupied by the portion other than the portions bent at the opposite ends of the discharge tube 35a is used as an effective emission area. Specifically, the display part other than the periphery of the liquid crystal display panel module 400 (the effective display area: an area corresponding to the outer outline of the aggregation of pixels) is disposed to coincide with the above-described effective emission area, whereby the electrodes 35d(1) and 35d(3) of each of the discharge tubes 35a disposed at the opposite ends thereof are positioned in an area outside the display part of the liquid crystal display panel module 400.

Figure 16A:
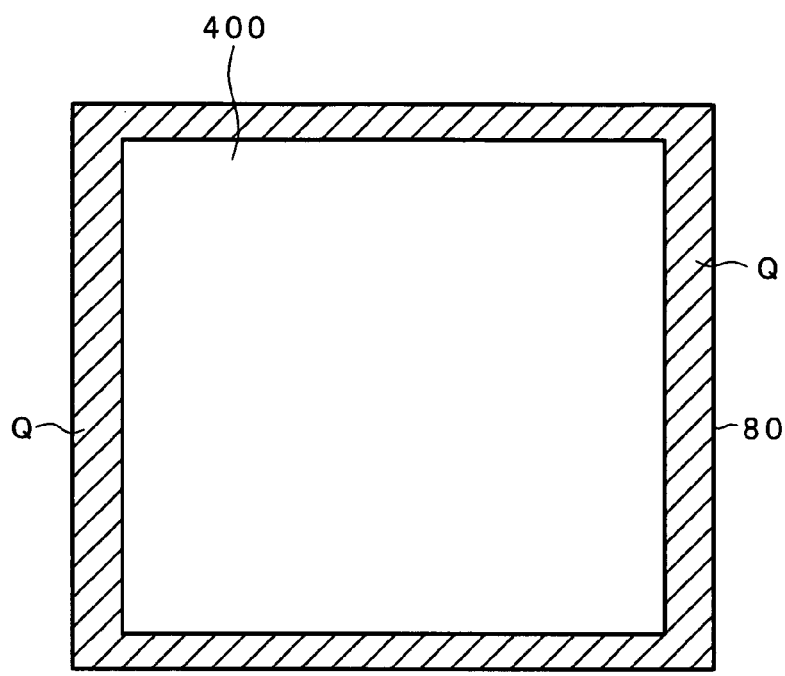
FIG. 16A, 16B and 16C are diagrams showing the advantage of the embodiment shown in FIGS. 15A and 15B.
Figure 16B:
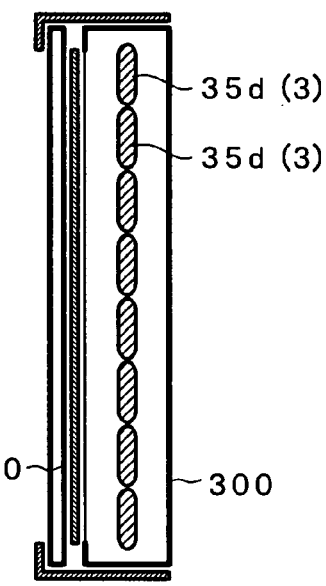
Figure 16C:
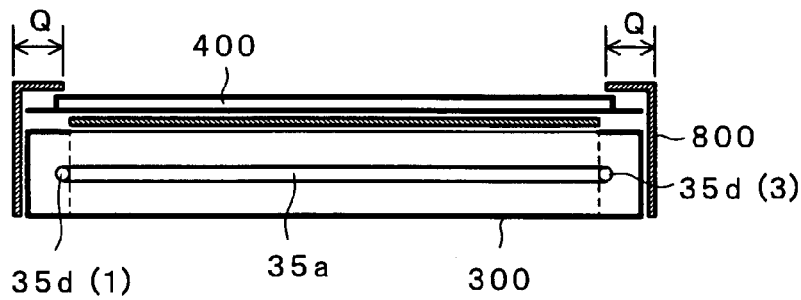

FIGS. 16A to 16C are views showing the positional relationship between the discharge tubes 35a disposed in this manner and the liquid crystal display panel module 400. FIG. 16A, 16B and 16C are a plan view, a left side view and a bottom side view, respectively.

In an area Q between the outline of the display part of the liquid crystal display panel module 400 and the outer outline of the upper frame 800, the opposite ends of each of the discharge tubes 35a at which the respective electrodes are disposed are positioned, and the opposite ends are bent with respect to the axial direction of each of the discharge tubes 35a, whereby the width of the area Q can be made smaller than the length of each of the opposite ends.

In the case of this embodiment, the bending direction of each of the opposite ends of each of the discharge tubes 35a is contained in a plane parallel to the liquid crystal display panel module 400, whereby it is possible to provide the advantage that it is not necessary to increase the depthwise thickness of the liquid crystal display device. Accordingly, it is possible to decrease the area occupied by the picture frame (the area Q shown in FIG. 16A) of the liquid crystal display device without the need to increase the depthwise thickness of the liquid crystal display device.

It has been confirmed that the efficiency of emission of this kind of discharge tube 35a can be improved particularly by increasing the width of each of the electrodes 35d provided on the discharge tube 35a. FIG. 17 is a graph showing the relationship between electrode width and lamp current flowing in the discharge tube 35a. FIG. 17 shows lamp current (mArms) with respect to applied voltage (Vrms) for each of electrode widths of 10 mm, 20 mm and 40 mm, and it can be seen from FIG. 17 that as the electrode width is larger, a larger lamp current flows even in the case of the same applied voltage.

In addition, as shown in FIG. 18, it can be seen that as the electrode width is made larger, the lamp current becomes larger irrespective of, for example, the length of the discharge tube (in FIG. 18, 100 mm, 200 mm and 300 mm).

Figure 19:
FIG. 19 is a schematic circuit diagram showing the equivalent circuit of the discharge tube which causes a discharge.

Each of the discharge tubes 35a which causes a discharge when a voltage is applied can be represented by the equivalent circuit shown in FIG. 19. In FIG. 19, symbol R denotes the resistance of the positive column of a discharge portion, and symbol Cd denotes the electrostatic capacity of glass (dielectric) interposed between the positive column and electrodes. In this case, letting V1 be the applied voltage, a lamp current 11 is expressed by the following equation (1):

$$\text{LAMP CURRENT II} = \frac{VI}{\sqrt{R^2 + \left(\frac{1}{\omega C}\right)^2}}. \quad (1)$$

As is apparent from this equation (1), if a larger current is to be supplied with a smaller voltage, the value of Cd of the electrode portion needs only to be increased; more specifically, the width of each of the electrodes may be increased or the area in which the electrodes and the discharge tube are opposed to each other may be increased.

Therefore, in the case where the widths of the respective electrodes 35d(1) and 35d(3) are made large and the portions of the respective electrodes 35d(1) and 35d(3) of each of the discharge tubes 35a are positioned to be superposed on the area other than the display part of the liquid crystal display panel module 400, without the portions of these electrodes 35d(1) and 35d (3) being bent, the width of the area called a picture frame becomes extremely large, but by adopting the above-described construction, it is possible to narrow the width to a great extent.

In contrast, in the case where the width of the area of the picture frame need not be narrowed, the length of each of the opposite ends of the discharge tube at which the respective electrodes are disposed can be made large by bending the opposite ends of the discharge tube, whereby the widths of the electrodes can be made large so that the efficiency of emission of the discharge tube can be increased to a great extent.

Embodiment 5

Figure 20:
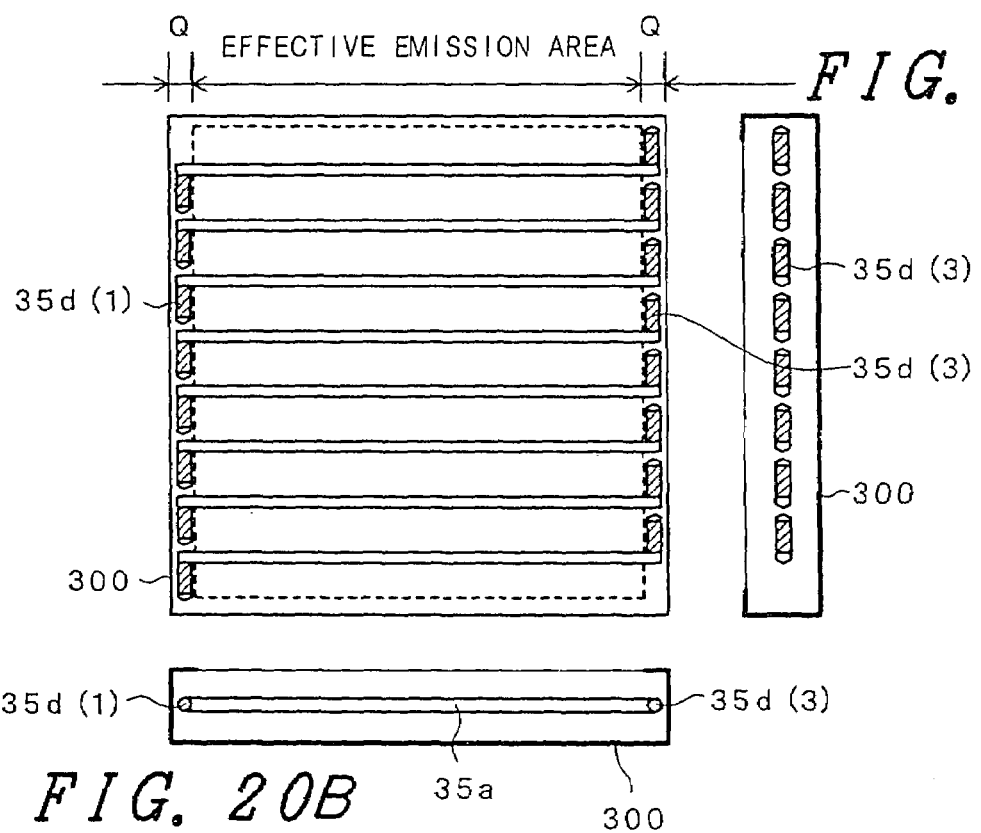

FIG. 20 is a plan showing another embodiment of the liquid crystal display device according to the invention, which generally corresponds to the arrangement of FIGS. 15A and 15B, and FIGS. 20A and 20B are side views thereof.

The electrode 35d(3) disposed at one end of each of the discharge tubes 35a shown in FIG. 20 is bent in the upward direction, as seen in FIG. 20A, while the electrode 35d(1) disposed at the other end is bent in the downward direction, as seen in FIG. 20. It goes without saying that even in this case, it is possible to obtain similar advantages.

Embodiment 6

FIG. 21 is a plan view showing another embodiment of the liquid crystal display device according to the invention, which generally corresponds to the arrangement of FIG. 20, and FIGS. 21A and 21B are side views thereof.

Each of the discharge tubes 35a shown in FIG. 21 has a U-like shape with a turning portion; whereby, with a single discharge tube, it is possible to realize substantially the same effect as two discharge tubes. The electrodes 35d(1) and 35d(3) disposed at the opposite ends of each of the discharge tubes 35a are positioned close to each other on one side, while the turning portion is positioned on the other side. Accordingly, the electrodes 35d(1) and 35d(3) are disposed so as to be superposed on one side in the periphery (picture frame) of the display part, while the turning portion is disposed so as to be superposed on the other side in the periphery of the display part. Incidentally, it is a matter of course that, if an electrode is not disposed in the turning portion, the turning portion may also be disposed in the display part without being superposed on the periphery of the display part.

In this case, each of the electrodes 35d(1) and 35d(3) is bent in the upward or downward direction as viewed in FIG. 21, whereby it is possible to narrow the width of the periphery of the display part and reduce the area occupied by the so-called picture frame (denoted by Q in FIG. 21).

Embodiment 7

FIG. 22 is a view showing another embodiment of the liquid crystal display device according to the invention, which generally corresponds to the arrangement of FIG. 21, and FIGS. 22A and 22B.

Similarly to the case shown in FIG. 21, discharge tubes 35a each having a U-like shape with a turning portion are used, but the entire length of each of the discharge tubes 35a is about half that of each of those shown in FIG. 21.

The discharge tubes 35a are disposed in the right-half and left-half areas of the backlight unit 300. In this case, each of the discharge tubes 35a is disposed so that the turning portion is positioned in the middle of the backlight unit 300, and the electrodes 35d(1) and 35d (3) are positioned in the periphery of the display part. Each of the electrodes 35d(1) and 35d(3) is bent in the downward (or upward) direction as viewed in FIG. 22, whereby it is possible to narrow the width of the periphery of the display part and reduce the area occupied by the so-called picture frame (denoted by Q in FIG. 22).

In addition, in this case, it goes without saying that it is possible to obtain similar advantages even if the direction indicated by the bent portion of each of the electrodes 35d(1) and 35d(3) is toward the bottom of the backlight unit 300, as shown in FIG. 23, and particularly in FIG. 23B. In this case, in each of the discharge tubes 35a which are positioned in the area of the display part, the portions where the respective electrodes 35d(1) and 35d(3) are disposed become portions which do not emit light. Accordingly, these portions are bent by 180° in the direction of the bottom of the backlight unit 300 so that they can be hidden behind the light-emitting portion of the same discharge tube 35a.

Embodiment 8

FIG. 24 is a plan view showing another embodiment of the liquid crystal display device according to the invention, which generally corresponds to the arrangement of FIG. 21, and FIGS. 24A and 24B are side views thereof.

Each of the discharge tubes 35a shown in FIG. 24 is constructed as a rectangular ring-shaped tube, and the electrodes 35d(1) and 35d(3) are respectively disposed in portions corresponding to the opposite ends of each of the discharge tubes 35a.

The construction of each of the discharge tubes 35a is similar to a construction in which two discharge tubes are integrally formed; and, in this case, the portions where the respective electrodes 35d(1) and 35d(3) are disposed become bent portions with respect to the other portion. Accordingly, these bent portions are positioned so as to be superposed on the periphery (non-display portion) of the display part, whereby the area occupied by the picture frame (the area denoted by Q in FIG. 24) can be narrowed.

FIG. 25 shows a far more improved construction in which all the discharge tubes are integrally formed.

Embodiment 9

FIG. 26 is a plan view showing another embodiment of the liquid crystal display device according to the invention, which generally corresponds to the arrangement of FIG. 21, and FIGS. 26A and 26B are side views thereof. Unlike the case shown in FIG. 21, the directions of individual bendings of the portions where the respective electrodes are disposed are not limited to a particular direction, and can be freely determined.

From this fact, as shown in FIG. 27, part of the portions where the respective electrodes are disposed may be bent in the direction of the bottom of the backlight unit 300, as seen particularly in FIG. 27B.

FIG. 28 shows another construction having a similar feature.

Embodiment 10

In the above-described embodiments, the directions of bendings of the portions where the respective electrodes are disposed are 90° or 180°. However, it goes without saying that even within the range between 0° and 180°, it is possible to obtain similar advantages.

For example, FIG. 29 shows an embodiment in which the directions of bendings of the portions where the respective electrodes are disposed are about 45° with respect to the axial direction (extending direction) of each of the discharge tubes 35a, as particularly seen in FIG. 29B. Even in this case, it is apparent that it is possible to narrow the width of the picture frame (the area denoted by Q in FIG. 29) as compared with the case in which the portions where the respective electrodes are disposed are not at all bent.

Embodiment 11

FIG. 30 is a plan view showing another embodiment of the liquid crystal display device according to the invention, and FIGS. 30A and 30B are side views thereof. The embodiment shown in FIG. 30 differs from the other embodiments in that the portions of each of the discharge tubes 35a where the respective electrodes 35d(1) and 35d(3) are disposed are helical, and the electrodes 35d(1) and 35d(3) are also helical according to the helical portions of each of the discharge tubes 35a.

In this case, the lengths of the respective electrodes 35d(1) and 35d(3) (the lengths along the axial direction of the discharge tube) that are formed at the opposite ends of each of the discharge tubes 35a can be increased to a great extent, and the portions where the respective electrodes 35d(1) and 35d(3) are disposed can be made helical so that the width occupied by each of the portions can be reduced to a great extent.

Embodiment 12

In each of the above-described embodiments, the backlight unit is a so-called direct backlight and includes plural linear light sources 35 disposed on the back side of the liquid crystal display panel. However, the backlight may, of course, be provided with a light guide plate.

Specifically, the liquid crystal display panel module 400 may be of the type which includes a light guide plate disposed so as to be opposed to at least the display part and a linear light source disposed on at least one side of the light guide plate. In the liquid crystal display panel module 400, after light from the light source has been guided into the interior of the light guide plate, the light is irradiated from the surface of the light guide plate, which is opposed to the liquid crystal display panel.

Figure 31:
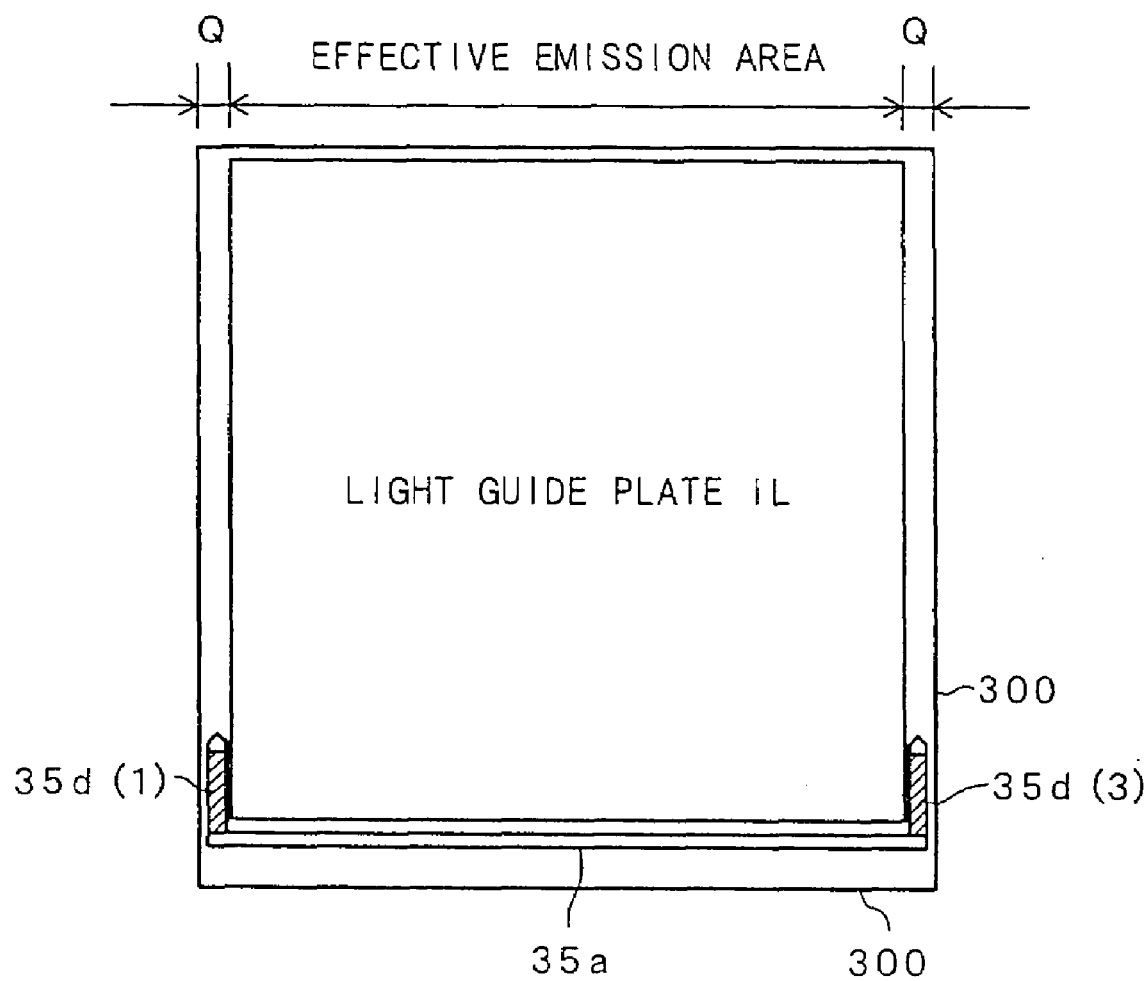
FIG. 31 is a plan view and FIG. 31A is a side view showing another embodiment of the backlight unit of the liquid crystal display device according to the invention.
Figure 31A:
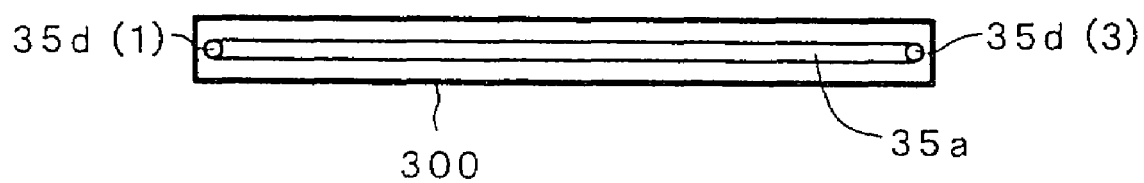

In this case, the discharge tube 35a shown in FIG. 5 is used as the light source, and as shown in FIG. 31, the opposite end portions of the discharge tube 35a where the respective electrodes 35d(1) and 35d(3) are disposed are bent, and the respective bent portions are disposed in parallel with and in proximity to the side surfaces of a light guide plate IL perpendicular to one side surface of the light guide plate IL (the surface of the light guide plate IL that is located on the side where the discharge tube 35a is disposed).

According to this construction, the discharge tube 35a disposed on one side of the light guide plate IL makes it possible for the electrodes 35d(1) and 35d(3) provided in the opposite end portions (portions which do not irradiate light) to be positioned externally of the one side, where by a far greater amount of light can be guided into the interior of the light guide plate IL.

In addition, since the portions of the electrodes 35d(1) and 35d(3) are respectively bent in the opposite end portions of the discharge tube 35a, there is the advantage that the width of the picture frame (the area denoted by Q in FIG. 31) on each of the sides of the light guide plate IL perpendicular to the discharge tube 35a can be made narrow compared to the case where the portions of the electrodes 35d(1) and 35d(3) are extended along the extending direction of the discharge tube 35a.

In the case of this embodiment, since the opposite-end electrode portions of the discharge tube 35a are 90° bent at 90° with respect to the extending direction of the discharge tube 35a, the width of the picture frame on each of the sides of the light guide plate IL perpendicular to the discharge tube 35a can also be set at a value approximately equal to the diameter of each of the electrodes 35d(1) and 35d(3).

Embodiment 13

FIG. 32 is a plan view showing another embodiment of the liquid crystal display device according to the invention, which generally corresponds to the arrangement of FIG. 31, and FIGS. 32A and 32B are side views thereof.

The embodiment shown in FIG. 32 is the same as the case shown in FIG. 31 in that the opposite end portions of the discharge tube 35a where the respective electrodes 35d(1) and 35d(3) are disposed are bent, but in the embodiment shown in FIG. 32, such opposite end portions are bent at an angle of 180° on the side of the discharge tube 35a opposite to the light guide plate IL.

As is apparent from FIG. 32, the opposite end portions of the discharge tube 35a, where the respective electrodes 35d(1) and 35d(3) are disposed, are opposed to one side of the light guide plate IL, but this construction does not particularly become a problem, because the electrodes 35d(1) and 35d(3) are hidden behind the portion of the discharge tube 35a where the electrodes 35d(1) and 35d(3) are not disposed.

Embodiment 14

Figure 33:
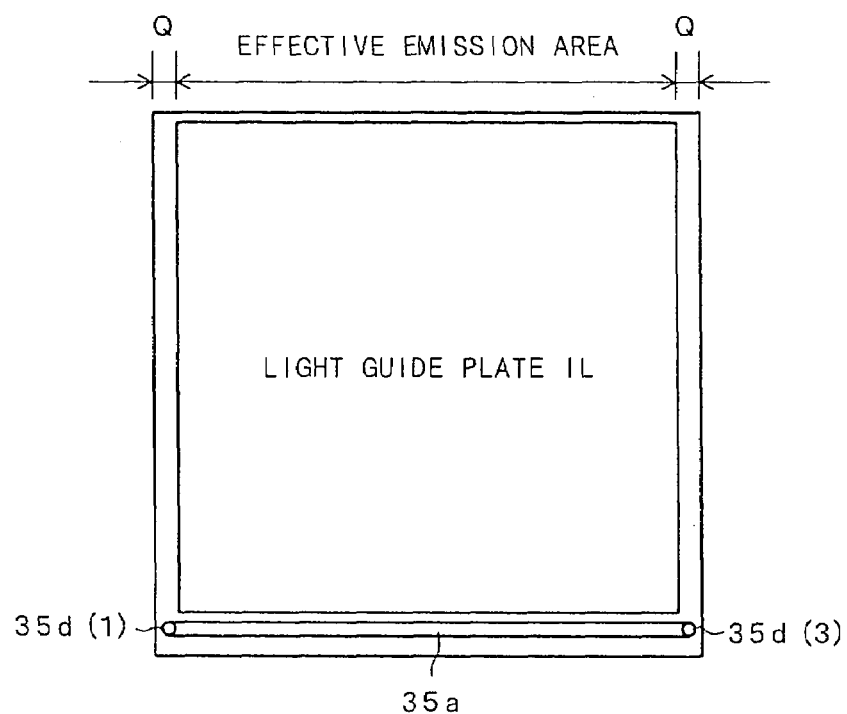
FIG. 33 is a plan view and FIG. 33A is a side view showing another embodiment of the backlight unit of the liquid crystal display device according to the invention.
Figure 33A:
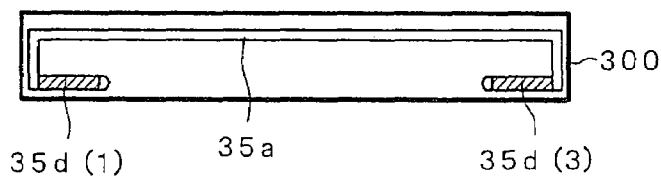

FIG. 33 is a view showing another embodiment of the liquid crystal display device according to the invention, which generally corresponds to the arrangement of FIG. 32, and FIGS. 33A and 33B are side views thereof.

The embodiment shown in FIG. 33 differs from the construction shown in FIG. 32 in that the opposite end portions of the discharge tube 35a where the respective electrodes 35d(1) and 35d(3) are disposed are bent at an angle of 180° in the direction of the bottom of the light guide plate IL (toward the bottom of the backlight unit 300).

Embodiment 15

In each of the above-described embodiments, the discharge tube 35a has a cylindrical shape which is the same in diameter from its center to each of its opposite ends, and it has a structure in which the opposite end portions of the discharge tube 35a, where the respective electrodes 35d(1) and 35d(3) are disposed, are bent. In this case, the lengths of the respective electrodes 35d(1) and 35d(3) (the lengths along the axial direction of the discharge tube 35) can be increased without the need to prepare a large space for the port ions where the respective electrodes 35d(1) and 35d(3) are disposed, whereby it is possible to improve the efficiency of emission of the discharge tube 35a.

Figure 34:
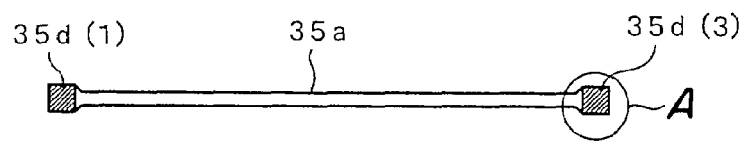
FIG. 34 is a longitudinal view showing another embodiment of a discharge tube to be provided in the backlight unit of the liquid crystal display device according to the invention.
Figure 34A:
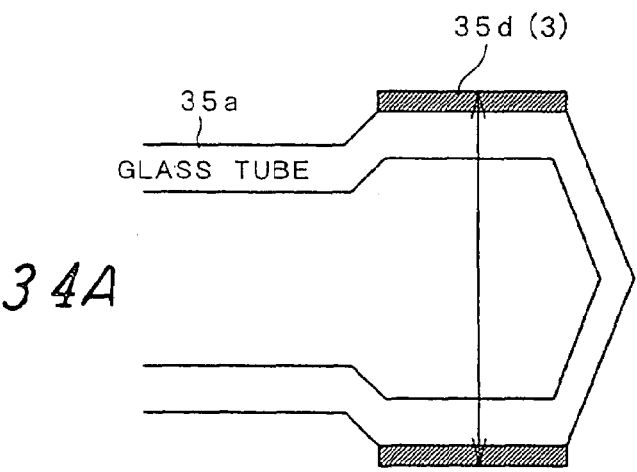
FIG. 34A is an enlarged sectional view of the area A in FIG. 34.

However, as shown in FIG. 34A, if the radius r of each of the opposite end portions of the discharge tube 35a where the electrodes 35d(1) and 35d(3) are disposed is made larger than the radius of the other portion of the discharge tube 35a (without the need to change the wall thickness of the discharge tube 35a), it is possible to improve the efficiency of emission of the discharge tube 35a. This is because the area of the portion of each of the electrodes 35d(1) and 35d(3) that is opposed to the glass tube can be made large so as to enlarge the electrostatic capacity.

Accordingly, by enlarging the diameter of each of the opposite end portions of the discharge tube 35a where the respective electrodes 35d(1) and 35d(3) are disposed, it is possible to reduce the lengths of the respective electrodes 35d(1) and 35d(3) (the lengths along the axial direction of the discharge tub 35). This means that if the opposite end portions of the discharge tube 35a where the respective electrodes 35d(1) and 35d(3) are disposed are positioned outside the display area as shown in FIG. 35, the area occupied by the so-called picture frame (the area denoted by Q in FIG. 35) can be reduced.

Incidentally, the embodiment shown in FIG. 35 is applied to the so-called direct backlight type of backlight unit 300, but it goes without saying that the invention can also be applied to a backlight using the light guide plate IL. This feature also applies to embodiments which will be described below.

FIG. 36 is a plan view corresponding to the arrangement of FIG. 35 and FIGS. 36A and 36B are side views thereof. The electrodes 35d(1) and 35d(3) provided at the opposite ends of each of the discharge tubes 35a have shapes formed to extend to the respective end surfaces of each of the discharge tubes 35a. In other words, the respective electrodes 35d(1) and 35d(3) are formed to cover the end surfaces of each of the discharge tubes 35a, whereby the area of each of the electrodes 35d(1) and 35d(3) that is opposed to the discharge tube 35a can be made large.

In this case, it is possible to make the lengths of the respective electrodes (the lengths along the axial directions of the discharge tube) far smaller.

Embodiment 16

Figure 37:
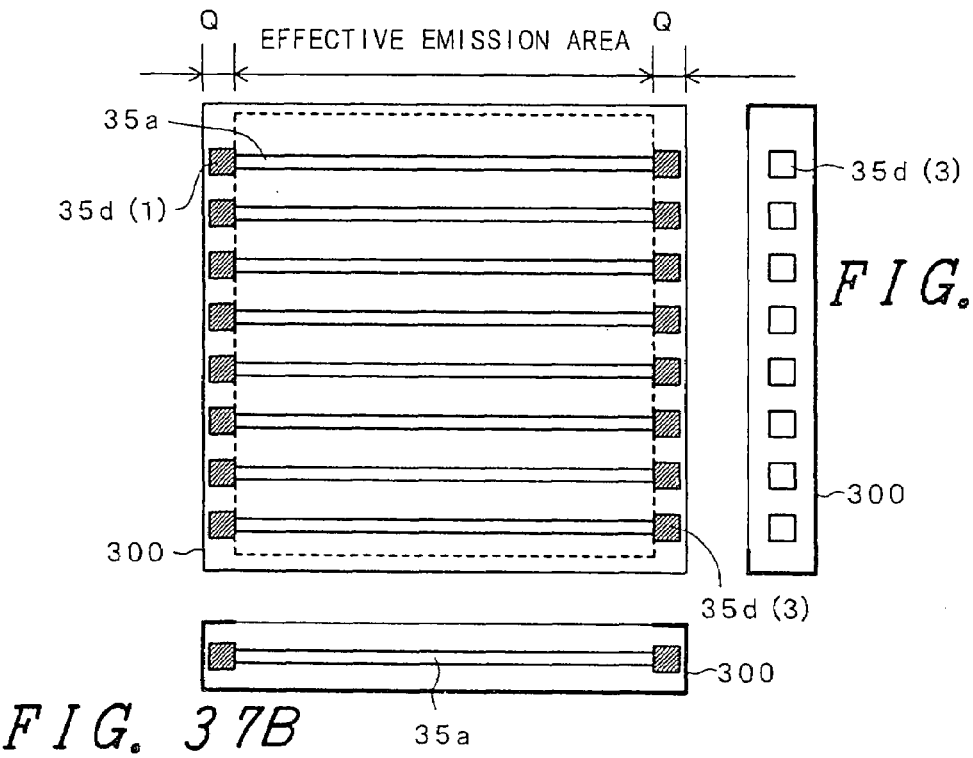
Figure 38:
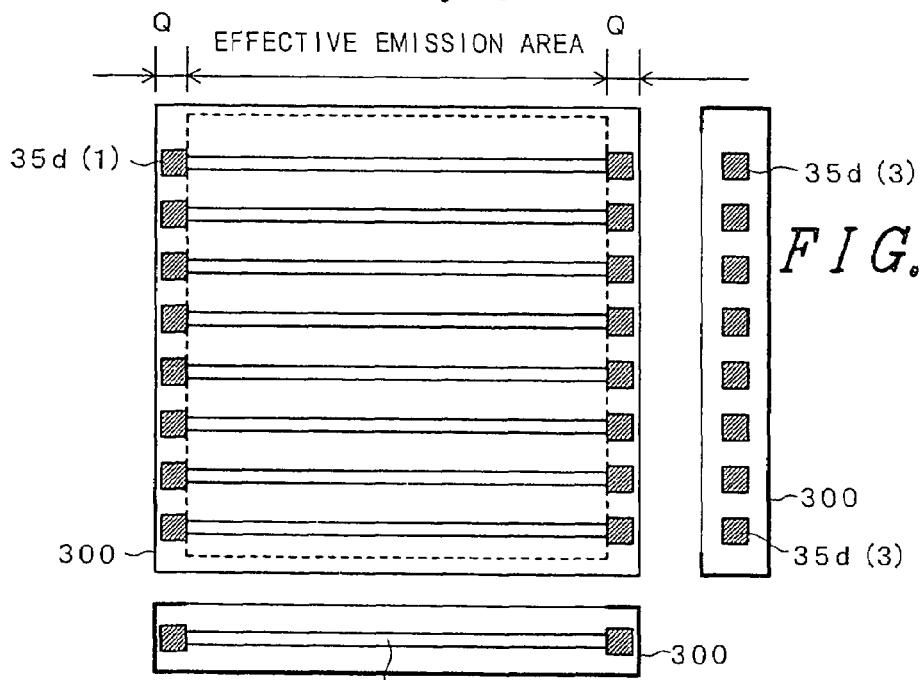

FIGS. 37 and 38 are views showing further improvements in Embodiment 15, which generally correspond to the arrangements of FIGS. 35 and 36, respectively.

In this case, the opposite end portions of each of the discharge tubes 35a where the respective electrodes 35d(1) and 35d(3) are disposed have cubic shapes, respectively, and the length of one side of each of the cubic portions is formed to be larger than the diameter of the other portion of the discharge tube 35a. Incidentally, the detailed construction of one of these portions is shown in FIG. 39 and FIG. 39A. In this case as well, it is possible to obtain similar advantages to those of Embodiment 15.

Incidentally, as shown in FIG. 39B by way of example, a discharge tube having the above-described shape can easily be formed by independently forming portions corresponding to the opposite end portions of the discharge tube 35a and the other portion of the discharge tube 35a and then fusing the portions to the other portion.

Embodiment 17

FIG. 40 is a view showing a further improvement in Embodiments 15 and 16, and FIG. 40A shows a cross section of one of the opposite end portions of one discharge tube 35a where the respective electrodes 35d(1) and 35d(3) are disposed.

The outer diameter of the discharge tube 35a is uniform along the axis direction thereof, but the inner diameter of the discharge tube 35a is made larger in the opposite end portions, where the respective electrodes 35d(1) and 35d(3) are disposed, than in the other portion of the discharge tube 35a. In other words, the wall thickness of the discharge tube 35a is made thin in the opposite end portions where the respective electrodes 35d(1) and 35d(3) are disposed. In this case as well, it is possible to obtain similar advantages to those of Embodiments 15 and 16.

Incidentally, it goes without saying that, if Embodiments 15 to 17 are applied to a construction in which the portions of the electrodes are bent, it is possible to obtain an even greater advantage.

Embodiment 18

FIG. 41 shows a construction in which at least one discharge tube 35a together with its electrodes 35d(1) and 35d(3) is disposed in the effective emission area of the backlight unit 300. In other words, there are other discharge tubes 35a each of which is positioned with either of the electrodes 35d(1) or 35d(3) superposed on the picture frame (the area denoted by Q in FIG. 41).

In this case, some of the electrodes are positioned in the effective emission area, but since at least these electrodes are 180° bent at 180° toward the bottom of the backlight unit 300, disadvantages due to the electrodes disposed in the effective emission area are solved.

In addition, Embodiment 18 has the advantage that since a plurality of short discharge tubes are arranged in the axial direction, the backlight unit 300 can cope with far larger picture screens. In this case, since the individual discharge tubes are short, their discharge starting voltage and discharge voltage can be suppressed.

At present, in the case of a picture screen of, for example, 18 inches or less, if only one discharge tube is disposed in the axial direction thereof, the discharge tube can fully cover the display area of the picture screen in that direction, but in the case of a large picture screen exceeding 18 inches, it is extremely effective to array a plurality of discharge tubes in the axial direction thereof.

As is apparent from the foregoing description, with the liquid crystal display device according to the invention, it is possible to achieve a lengthening of the life of the liquid crystal display device.

In addition, with the liquid crystal display device according to the invention, it is possible to narrow the picture frame area (the area between the outline of the outer frame of the liquid crystal display device and the outline of the display area thereof).

The invention claimed is:

1. A liquid crystal display device comprising:
   a liquid crystal display panel having a display part in its central portion except its periphery; and
   a backlight disposed on a back side of the liquid crystal display panel,
   the backlight including a discharge tube having electrodes at least at its opposite ends, the electrodes being disposed at the exterior of the discharge tube, at least one of the opposite end portions of the discharge tube where the respective electrodes are disposed is constructed as a bent portion which is bent with an angle with respect to the central axis of the discharge tube, at least the portion of the bent portion where the electrode is formed being superposed in the area of the display part of the liquid crystal display panel.

2. A liquid crystal display device according to claim 1, wherein at least one of the opposite end portions of the discharge tube where the respective electrodes are disposed is bent at greater than 90° and not greater than 180° with respect to the central axis of the discharge tube.

3. A liquid crystal display device according to claim 1, wherein at least one of the opposite end portions of the discharge tube where the respective electrodes are disposed is bent at 180° with respect to the central axis of the discharge tube toward the opposite side to the liquid crystal display panel.

4. A liquid crystal display device according to claim 1, wherein the area of the display part of the liquid crystal display panel in which at least a portion of the bent portion where the electrode is formed and is superposed is an effective emission area of the display part of the liquid crystal display panel.

* * * * *